US010665895B2

(12) United States Patent
Pratt

(10) Patent No.: US 10,665,895 B2
(45) Date of Patent: May 26, 2020

(54) POLYMER COMPOSITION WITH OLEFINIC GROUPS FOR STABILIZATION OF LITHIUM SULFUR BATTERIES

(71) Applicant: Seeo, Inc, Hayward, CA (US)

(72) Inventor: Russell Clayton Pratt, San Mateo, CA (US)

(73) Assignee: SEEO, INC., Hayward, CA (US)

( * ) Notice: Subject to any disclaimer, the term of this patent is extended or adjusted under 35 U.S.C. 154(b) by 179 days.

(21) Appl. No.: 14/718,085

(22) Filed: May 21, 2015

(65) Prior Publication Data

US 2015/0303516 A1 Oct. 22, 2015

Related U.S. Application Data

(63) Continuation-in-part of application No. PCT/US2014/062415, filed on Oct. 27, 2014.

(60) Provisional application No. 61/981,735, filed on Apr. 18, 2014, provisional application No. 61/981,732, filed on Apr. 18, 2014.

(51) Int. Cl.
| | |
|---|---|
| *H01M 10/0565* | (2010.01) |
| *H01M 4/136* | (2010.01) |
| *H01M 4/58* | (2010.01) |
| *H01M 4/62* | (2006.01) |
| *H01M 10/052* | (2010.01) |
| *H01M 4/02* | (2006.01) |
| *B01J 39/19* | (2017.01) |

(52) U.S. Cl.
CPC ......... *H01M 10/0565* (2013.01); *B01J 39/19* (2017.01); *H01M 4/136* (2013.01); *H01M 4/5815* (2013.01); *H01M 4/622* (2013.01); *H01M 4/625* (2013.01); *H01M 10/052* (2013.01); *H01M 2004/028* (2013.01); *H01M 2300/0082* (2013.01)

(58) Field of Classification Search
CPC .................................................. H01M 10/0565
See application file for complete search history.

(56) References Cited

U.S. PATENT DOCUMENTS

| | | | |
|---|---|---|---|
| 5,061,581 A | 10/1991 | Narang et al. | |
| 5,324,599 A | 6/1994 | Oyama | |
| 5,414,025 A | 5/1995 | Allcock et al. | |
| 5,462,566 A | 10/1995 | Skotheim | |
| 5,506,073 A | 4/1996 | Angell et al. | |
| 5,792,575 A | 8/1998 | Naoi | |
| 6,159,639 A | 12/2000 | Wen et al. | |

(Continued)

FOREIGN PATENT DOCUMENTS

| | | |
|---|---|---|
| CN | 1393954 A | 1/2003 |
| CN | 1305163 C | 3/2007 |

(Continued)

OTHER PUBLICATIONS

Definitions (Year: 2018).*

(Continued)

*Primary Examiner* — Brian R Ohara
(74) *Attorney, Agent, or Firm* — Brooks Kushman P.C.

(57) ABSTRACT

A polymer that can be used as a binder for sulfur-based cathodes in lithium batteries is disclosed. The polymer includes in its composition olefinic groups capable of reaction with and entrapment of polysulfide species. Beneficial effects include reductions in capacity loss and/or ionic resistance gain.

8 Claims, 8 Drawing Sheets

(56) References Cited

U.S. PATENT DOCUMENTS

| | | | |
|---|---|---|---|
| 6,200,704 | B1 | 3/2001 | Katz et al. |
| 6,225,002 | B1 | 5/2001 | Nimon |
| 6,355,380 | B1 | 3/2002 | Yun et al. |
| 6,869,729 | B1 | 3/2005 | Pope et al. |
| 6,884,547 | B2 | 4/2005 | Mori et al. |
| 8,268,197 | B2 | 9/2012 | Singh et al. |
| 8,563,168 | B2 | 10/2013 | Balsara et al. |
| 8,597,832 | B2 | 12/2013 | Deromelaere et al. |
| 8,598,273 | B2 | 12/2013 | Eitouni et al. |
| 8,691,928 | B2 | 4/2014 | Hsieh et al. |
| 8,889,301 | B2 | 11/2014 | Balsara et al. |
| 9,048,507 | B2 | 6/2015 | Eitouni et al. |
| 9,136,562 | B2 | 9/2015 | Singh et al. |
| 9,252,425 | B2 | 2/2016 | Wegner et al. |
| 2002/0012846 | A1 | 1/2002 | Skotheim et al. |
| 2002/0014616 | A1 | 2/2002 | Allcock et al. |
| 2002/0028387 | A1* | 3/2002 | Gavelin ............... H01M 6/162 429/303 |
| 2002/0045102 | A1 | 4/2002 | Jung et al. |
| 2002/0106561 | A1 | 8/2002 | Lee |
| 2002/0136948 | A1* | 9/2002 | Missling ............... H01M 4/04 429/212 |
| 2002/0185627 | A1 | 12/2002 | Chen-Yang et al. |
| 2003/0091904 | A1 | 5/2003 | Munshi |
| 2003/0124431 | A1* | 7/2003 | Hwang ............... H01M 10/052 429/316 |
| 2003/0180623 | A1 | 9/2003 | Yun et al. |
| 2004/0030580 | A1 | 2/2004 | Byleveld |
| 2004/0059016 | A1 | 3/2004 | Nishikitani et al. |
| 2004/0131934 | A1 | 7/2004 | Sugnaux et al. |
| 2009/0026662 | A1 | 1/2009 | Yun et al. |
| 2009/0075176 | A1 | 3/2009 | Singh et al. |
| 2009/0294307 | A1 | 12/2009 | Liu et al. |
| 2010/0227224 | A1 | 9/2010 | Eitouni et al. |
| 2010/0239918 | A1* | 9/2010 | Pratt ............... H01M 10/056 429/307 |
| 2011/0003201 | A1 | 1/2011 | Tsukagoshi et al. |
| 2011/0003211 | A1* | 1/2011 | Hudson ............... H01M 4/13 429/304 |
| 2011/0206994 | A1* | 8/2011 | Balsara ............. H01M 10/0565 429/302 |
| 2011/0256450 | A1 | 10/2011 | Campbell et al. |
| 2011/0281173 | A1* | 11/2011 | Singh ............... H01M 2/16 429/306 |
| 2011/0318654 | A1 | 12/2011 | Janssen |
| 2013/0052584 | A1* | 2/2013 | Iwai ............... G03F 7/11 430/271.1 |
| 2013/0065128 | A1 | 3/2013 | Li et al. |
| 2013/0230779 | A1 | 9/2013 | Kaneko et al. |
| 2013/0337293 | A1 | 12/2013 | Eisele et al. |
| 2014/0030580 | A1 | 1/2014 | Tenzer et al. |
| 2014/0127589 | A1 | 5/2014 | Wegner et al. |
| 2015/0280218 | A1 | 10/2015 | Zimmerman et al. |

FOREIGN PATENT DOCUMENTS

| | | | |
|---|---|---|---|
| CN | 1937285 | A | 3/2007 |
| CN | 102110849 | A | 6/2011 |
| CN | 102272990 | A | 12/2011 |
| CN | 102906177 | A | 1/2013 |
| JP | H07320781 | A | 12/1995 |
| JP | 2001023687 | A | 1/2001 |
| JP | 2002056893 | A | 2/2002 |
| JP | 2002075446 | A | 3/2002 |
| JP | 2002289052 | A | 10/2002 |
| JP | 2006147276 | A | 6/2006 |
| JP | 2009235240 | A | 10/2009 |
| JP | 2010033875 | A | 2/2010 |
| JP | 2011510456 | A | 3/2011 |
| JP | 2011180469 | A | 9/2011 |
| JP | 2013229257 | A | 11/2013 |
| JP | 2014501436 | A | 1/2014 |
| WO | 2001091222 | A1 | 11/2001 |
| WO | 2009146340 | A1 | 12/2009 |
| WO | 2009157206 | A1 | 12/2009 |
| WO | 2010083325 | A1 | 7/2010 |
| WO | 2010083330 | A1 | 7/2010 |
| WO | 2012090855 | A1 | 7/2012 |
| WO | 2012150061 | A1 | 11/2012 |
| WO | 2015153729 | A1 | 10/2015 |

OTHER PUBLICATIONS

Definitions (Year: 2019).*
"All-solid lithium-sulfur battery stores four times the energy of lithium-ions". Gizmag.com. Jun. 7, 2013.
"New lithium/sulfur battery doubles energy density of lithium-ion". Gizmag.com. Dec. 1, 2013.
"Researchers increase lifespan of lithium-sulfur batteries". Gizmag.com. Apr. 4, 2013.
Caryl Richards, :Radical approach to turn sulfur into polymers, Chemistry World, Apr. 16, 2013.
Chung, W. J.; Griebel, J. J.; Kim, E. T.; Yoon, H.; Simmonds, A. G.; Ji, H. J.; Dirlam, P. T.; Glass, R. S.; Wie, J. J.; Nguyen, N. A.; Guralnick, B. W.; Park, J.; Somogyi, A. D.; Theato, P.; MacKay, M. E.; Sung, Y. E.; Char, K.; Pyun, J. (2013). "The Use of elemental sulfur as an alternative feedstock for polymeric materials". Nature Chemistry 5 (6): 518-524. doi:10.1038/nchem.1624.PMID 23695634. edit.
Guangyuan, Zheng; Yuan Yang, Judy J. Cha, Seung Sae Hong, Yi Cui (Sep. 14, 2011). "Hollow Carbon Nanofiber-Encapsulated Sulfur Cathodes for High Specific Capacity Rechargeable Lithium Batteries". Nano Letters: 4462-4467. Bibcode:2011NanoL . . . 11.4462Z. doi:10.1021/nl2027684.
Keller, Sarah Jane (Oct. 4, 2011). "Sulfur in hollow nanofibers overcomes challenges of lithium-ion battery design". News (Stanford, CA, USA: Stanford University). Retrieved Feb. 18, 2012.
Lin, Z., Liu, Z., Fu, W., Dudney, N. J. and Liang, C. (2013), Lithium Polysulfidophosphates: A Family of Lithium-Conducting Sulfur-Rich Compounds for Lithium-Sulfur Batteries . Angew. Chem. Int. Ed., 52: 7460-7463. doi: 10.1002/anie.201300680.
SLAC National Accelerator Laboratory (6 Posts) (Jan. 8, 2013). "World-Record Battery Performance Achieved With Egg-Like Nanostructures". CleanTechnica. Retrieved Jun. 11, 2013.
Wei Seh, Z.; Li, W.; Cha, J. J.; Zheng, G.; Yang, Y.; McDowell, M. T.; Hsu, P. C.; Cui, Y. (2013). "Sulphur—TiO2 yolk-shell nanoarchitecture with internal void space for long-cycle lithium-sulphur batteries". Nature Communications 4: 331. doi:10.1038/ncomms2327. PMID 23299881.
Xiulei Ji, Kyu Tae Lee, and Linda F. Nazar. (May 17, 2009)"A highly ordered nanostructured carbon-sulphur cathode for lithium-sulphur batteries." Nature Materials.
Ikeda, "Ionic Conductivity of Polymer Solid Electrolyte Prepared from Poly[epichlorohydrin-co-(Ethylene Oxide)] of High Ethylene Oxide Content," Journal of Applied Polymer Science, vol. 95, 178-184 (2005.
D. Marmorstein, T.H. Yu, K.A. Striebel, F.R. McLamon, J. Hou, and E.J. Cairns, "Electrochemical performance of lithium-sulfur cells with three different polymer electrolytes," Journal of Power Sources 89 (2000) 219-226.
Evers et al., New Approaches for High Energy Density lithium-Sulfur Battery: Accounts of Chemical Research, Oct. 10, 2012 (Oct. 10, 2012), abstract, p. 1135-1143.
F. Tudron, J. Akridge and V. Puglisi, "Lithium-Sulphur Rechargeable Batteries: Characteristics, State of Development and Applicability to Powering Portable Electronics", Proceedings of the 41st Power Sources Conference (Jun. 2004).
Jeon, Yeon, Kim, and Chung, "Preparation and electrochemical properties of lithium-sulfur polymer batteries," Journal of Power Sources 109 (2002) 89-97.
Jiulin Wang, Lu Liu, Zhijun Ling, et al., "Polymer lithium cells with sulfur composites as cathode materials," Electrochimica Acta 48 (2003) 1861-1867.
Joongpyo Shim, Kathryn A. Striebel, and Elton J. Cairns, The Lithium-Sulfur Rechargeable Cell: Effects of Electrode Composition and Solvent on Cell Performance, Journal of the Electrochemical Society, 149 (10) A1321-A1325 (2002).

(56) References Cited

OTHER PUBLICATIONS

Takeshi Kobayashia, Yuki Imadea, Daisuke Shishiharaa, et al., "All solid-state battery with sulfur electrode and thio-LISICON electrolyte," Journal of Power Sources 182 (2008) 621-625.
International Search Report for Application No. PCT/US14162415.
DeGraaf, Geochimica et Cosmochimica Acta vol. 56, pp. 4321-4328, 1992.
DeGraaf, "Low-temperature addition of hydrogen polysulfides to olefins . . . , " J. Chem. Soc. Perkin Trans. I 1995.
Glenn Carroll, "Polysulfides—Nature's Organic Soluble Sulfur," Phosphorus, Sulfur, and Silicon, 1994. vol. 95-96, pp. 517-518.
PCT-077PCT_ISR_PCTUS1462415.
Wei Seh, Z.; Li, W.; Cha, J. J.; Zheng, G.; Yang, Y.; McDowell, M. T.; Hsu, P. C.; Cui, Y. (2013). "Sulphur—TiO2 yolk-shell nanoarchitecture with internal void space for long-cycle lithium-sulphur batteries". Nature Communications 4: 331. doi:10.1038/ncomms2327. PMID 23299881 (Ref 8).
Xiulei Ji, Kyu Tae Lee, and Linda F. Nazar. (May 17, 2009)"A highly ordered nanostructured carbon-sulphur cathode for lithium-sulphur batteries." Nature Materials (Ref 1).
De Graaf, "Low-temperature addition of hydrogen polysulfides to olefins: formation of 2,2'-dialkyl polysulfides from alk-1-enes and cyclic (poly)sulfides and polymeric organic sulfur compounds from a,w-dienes," J. Chem. Soc. Perkin. Trans. 1 1995, 635-640.
De Graaf, "Laboratory simulation of natural sulphurization: I. Formation of monomeric and oligomeric isoprenoid polysulphides by low-temperature reactions of inorganic polysulphides with phytol and phytadienes," Geochim. Cosmochim. Acta 1992, 56, 4321-4328.
Glenn Carroll, "Polysulfides—Natures Organic Soluble Sulfur," Phosphorus, Sulfur, and Silicon and the Related Elements, 95:1-4, (1994) 517-518.
De Graaf, Low-temperature addition of hydrogen polysulfides to olefins: formation of 2,2'-dialkyl polysulfides from alk-1-enes and cyclic (poly)sulfides and polymeric organic sulfur compounds from a,w-dienes, J. Chem. Soc. Perkin Trans. I 1995.
DeGraaf, "Laboratory simulation of natural sulphurization: I. Formation of monomeric and oligomeric isoprenoid polysulphides by low-temperature reactions of inorganic polysulphides with phytol and phytadienes," Geochimica et Cosmochimica Acto vol. 56, pp. 4321-4328.
Glenn Carroll (1994) Polysulfides—Natures Organic Soluble Sulfur, Phosphorus, Sulfur, and Silicon and the Related Elements, 95:1-4, 517-518, DOI: 10.1080/10426509408034301.
IUPAC. Compendium of Chemical Terminology, 2nd ed. (the "Gold Book"). Compiled by A. D.McNaught and A. Wilkinson. Blackwell Scientific Publications, Oxford (1997). XML on-linecorrected version: http://goldbook.iupac.org (2006-) created by M. Nic, J. Jirat, B. Kosata;updates compiled by A. Jenkins. ISBN 0-9678550-9-8. https://doi.org/10.1351/goldbook.
David, Lee, Harry Allcock, The effects of cations and anions on the ionic conductivity ofpoly[bis(2-(2-methoxyethoxy)ethoxy)phosphazene] doped with lithiumand magnesium salts of trifluoromethanesulfonate and bis (trifluoromethanesulfonyl)imidate, 2010, Solid State Ionic (Year: 2010).
Extended European search report, dated Aug. 29, 2017, for EP application 14889681.4 (PCT/US2014062415).
Ikeda, Ionic Conductivity of Polymer Solid Electrolyte Prepared from Poly[epichlorohydrin-co-(Ethylene Oxide)] of High Ethylene Oxide Content, 2004 (Year: 2004).
Kim Changsuk, Polymer electrolytes prepared by polymerizing mixtures of polymerizable PEO-oligomers, copolymer of PVDC andpoly(acrylonitrile), and lithium triflate, 1999, Solid State Ionics (Year: 1999).
Luo, Highly Amorphous Solid Polymer Electrolytes for Lithium-Ion Batteries, 2007, The Electrochemical Society (Year: 2007).
Machine translation of JP2013229257 from the Japanese Platform for Patent Information.
Shih-To Fei, Harry Allcock, Methoxyethoxyethoxyphosphazenes as ionic conductive fire retardantadditives for lithium battery systems, 201 O,Journal of Power Source. (Year: 2010).
Machine translation of JP2006-147276.
Machine translation of JP2013229257A.
Translation of Office Action from Korean Patent Office for SE-077KR—KR counterpart of U.S. Appl. No. 15/289,928—dated Feb. 27, 2018.
Translation of Office Action received from Japan Patent Office dated Apr. 27, 2018 for JP patent application corresponding to SE-077US (U.S. Appl. No. 15/289,928).
Machine translation of WO2009157206.
Machine translation of WO2012090855.

\* cited by examiner

POLYMER COMPOSITION WITH OLEFINIC GROUPS FOR STABILIZATION OF LITHIUM SULFUR BATTERIES

CROSS-REFERENCE TO RELATED APPLICATIONS

This application is a Continuation-in-Part of International Application Number PCT/US14/62415, filed Oct. 27, 2014, which is a non-provisional application of U.S. Provisional Application No. 61/981,732, filed Apr. 18, 2014 and U.S. Provisional Application No. 61/981,735, filed Apr. 18, 2014, all of which are included by reference herein.

BACKGROUND OF THE INVENTION

Field of the Invention

This invention relates generally to lithium metal electrochemical cells, and, more specifically, to sulfur-based cathodes in lithium metal batteries with polymeric electrolytes.

Sulfur-based materials are attractive cathode active materials for lithium batteries due to their high lithium capacities. For example the theoretical lithium capacity for elemental sulfur is 1675 mAh/g, and capacities for sulfur compounds can be as high as 800 mAh/g or so, as compared with capacities around 170 mAh/g for conventionally used cathode materials such as lithium iron phosphate. However, lithium batteries that have sulfur-based cathodes tend to have poor cycling stability due to the formation and migration of lithium polysulfide salts (e.g., LiSx, 3<x<8) as well as the formation and/or diffusion of elemental sulfur out of the cathode layer. These unbound sulfur-containing species separate from the cathode layer, causing irreversible capacity loss, and can migrate to the anode and decompose, causing an increase in internal ionic resistance of the cell or outright decomposition of the anode.

Lithium metal-based materials are attractive anode active materials for lithium batteries due to their high specific capacities of 3860 mAh/g. Coupling lithium metal anodes to sulfur-containing cathodes would provide a very high specific capacity cell, and would result in a high specific energy cell. However, stable cycling and safe operation of batteries containing lithium metal have proved elusive, no matter what cathode material is used, due to either a reaction of the lithium metal with the electrolyte or formation of lithium dendrites upon cycling.

Improvements in stability, cyclability and lifetime of lithium-sulfur batteries are usually sought through the use of sulfur composites in which inactive materials are combined with sulfur to prevent diffusion of polysulfide and sulfur species. Examples include using carbon structures or other molecular encaging species that can physically and/or chemically sequester sulfur and/or lithium polysulfides, or can react with sulfur to form immobile species such as graphite or cyclized PAN that chemically sequester the sulfur. Another example is using single-ion conductors that allow transport of Li cations, but not anions or elemental sulfur species. Examples of such single-ion conductors include $Li_3N$, LISICON, LIPON, Thio-LISICON, $Li_2S$—$P_2S_5$, and the like. Suppression of lithium dendrites has been attempted by use of high modulus electrolytes such as cross-linked PEO, block copolymer electrolytes, and inorganic conductors.

What is really needed is a way to take full advantage of the high lithium capacity of sulfur-containing cathode materials coupled with lithium metal electrodes to make stable, long life cycle electrochemical cells.

Lithium-sulfur couples have been studied as they have the potential to produce batteries with higher capacity and higher energy than conventional Li-ion batteries. However, there are many problems with these systems. One problem is that sulfur is very soluble in typical liquid electrolytes. In a conventional sulfur-based electrochemical cell system, the sulfur in the cathode (in the form of polysulfides, for example) dissolves in the electrolyte and diffuses to the anode where it reacts with the lithium to form lithium sulfides. Trapped at the anode in the reduced state, the sulfur cannot be reoxidized to the original form and be returned to the cathode. This leads to rapid capacity fade and high impedance, resulting ultimately in cell death.

Another problem associated with lithium-sulfur systems arises from loss of surface area in the electrodes. During cycling, sulfur in the electrode region aggregates into larger particles, permanently changing the morphology of the cathode. The change in morphology results in reduced ionic and electronic conductivity. Thus it has not been possible to produce viable battery systems from lithium-sulfur couples.

It would be useful to construct a battery in which sulfur could be used as the active cathode material in order to exploit the high capacity and high energy that sulfur can provide.

BRIEF DESCRIPTION OF THE DRAWINGS

The foregoing aspects and others will be readily appreciated by the skilled artisan from the following description of illustrative embodiments when read in conjunction with the accompanying drawings.

SUMMARY

Figure 1A:
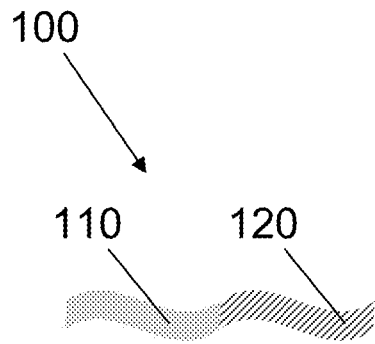
FIG. 1A is a schematic drawing of a diblock copolymer molecule, according to an embodiment of the invention.

A new polymer composition is disclosed in the embodiments of the invention. The new composition is an ionically conductive polymer that includes an olefinic group capable of or configured to undergo polysulfide addition. The polymer may have at least two different monomers, wherein a first monomer is ionically conductive and a second monomer comprises the olefinic group capable of polysulfide addition. The ionically conductive monomer may be any of ethylene oxides, acrylonitriles, phosphoesters, ethers, amines, imides, amides, alkyl carbonates, nitriles, siloxanes, phosphazines, olefins, dienes, and combinations thereof. The olefinic group may be any allyl group such as allyloxymethyl and vinyl groups. The polymer may be used as an electrolyte with the addition of an electrolyte salt, such as a lithium salt.

The polymer composition may combine with elemental sulfur, carbon, and a metal salt to form a cathode. The elemental sulfur may also have one or more additives, such as carbon, silica, aluminum oxide, and titanium dioxide, to form a sulfur composite. There may also be a current collector in electrical communication with the cathode.

In one embodiment of the invention, an electrochemical cell has a cathode as described above that includes a Li salt, a lithium metal anode, and a separator between the cathode and the anode. The separator provides a path for ionic conduction between the cathode and the anode. In one arrangement, there is also a layer of the polymer composition described above between the cathode and the separator.

In another embodiment of the invention, a block copolymer electrolyte has a first lamellar domain comprising a plurality of first polymer blocks made from the polymer composition described above and a salt and a second lamellar adjacent to the first lamellar domain and comprising a plurality of second polymer blocks the second domain. The first domain forms a conductive portion of the electrolyte material. The second domain forms a structural portion of the electrolyte material.

The first lamellar domain and the second lamellar domain may comprise a plurality of linear diblock copolymers. The linear diblock copolymer may have a molecular weight of at least 150,000 Daltons or at least 350,000 Daltons.

The first lamellar domain and the second lamellar domain may comprise a plurality of linear triblock copolymers.

The second polymer blocks may comprise a non-ionic-conducting polymer with a bulk modulus greater than $10^7$ Pa at 90 degrees C. The second polymer blocks may comprise a component selected from a group comprising styrene, methacrylate, vinylpyridine, vinylcyclohexane, imide, amide, propylene, alphamethylstyrene and combinations thereof.

An electrochemical cell is disclosed. The cell has a cathode that contains at least a SPAN cathode active material, an electronically conducting agent, and a first polymer electrolyte that contains a lithium salt, all mixed together. The cell has a lithium anode and a separator positioned between the cell and the anode. The anode may be a lithium metal film.

In one arrangement, the first polymer electrolyte is a liquid and the cell also contains a binder. In another arrangement, the first polymer electrolyte is a solid polymer electrolyte. The separator may contain a second solid polymer electrolyte.

At least one of the first polymer electrolyte and the separator may be configured to react chemically with elemental sulfur. At least one of the first polymer electrolyte and the separator may contain a radical-generating species, such as bromine, TEMPO groups or pendant methacrylate groups.

At least one of the first polymer electrolyte and the separator may be configured to react chemically with lithium polysulfide. At least one of the first polymer electrolyte and the separator may include an electrolyte salt and an ionically conductive polymer that includes an electrophilic group capable of nucleophilic substitution or an ionically conductive polymer that includes an olefinic group capable of polysulfide addition.

At least one of the first polymer electrolyte and the separator may be configured to sequester sulfur by physical interaction. At least one of the first polymer electrolyte and the separator may contain a linear copolymer of carbonates. ethylene oxide (P(LC-EO)), and P(LC-EO)s which incorporate thioethers linkages in addition to ether linkages (P(LC-TEO)). At least one of the first polymer electrolyte and the separator may contain a molecule that has a polymer backbone to which polar groups are attached. At least one of the first polymer electrolyte and the separator may contain a molecule that has a polyether backbone with cyclic carbonates grafted as side groups (P(GC-EO)). The polymer backbone may be any of (P(GN-EO) or P(GP-EO)), polyalkanes, polyphosphazenes, or polysiloxanes. The polar groups may be any of nitrile groups (GN), phosphonate groups (GP), prises poly phosphorus esters.

At least one of the first polymer electrolyte and the separator may be configured to sequester lithium polysulfide by physical interaction. In one arrangement, at least one of the first polymer electrolyte and the separator contains a polyelectrolyte, such as a cationic polymer with counterions such as any of Cl$^-$, TFSI$^-$, BETI$^-$, ClO$_4^-$, BF$_4^-$, PF$_6^-$, Triflate$^-$, and BOB$^-$. In another arrangement, at least one of the first polymer electrolyte and the separator contains an anionic polymer, such as any of Nafion®, poly(styrene sulfonate), polyvinyl and sulfonate.

In one embodiment of the invention, at least one of the first polymer electrolyte and the separator contains a block copolymer that has a first lamellar domain made of first polymer blocks that contain an ionically conductive polymer that includes an electrophilic group capable of nucleophilic substitution and an electrolyte salt and a second lamellar domain made of second polymer blocks, the second domain adjacent the first lamellar domain and forming a structural portion of the electrolyte material. The second polymer blocks may have a component such as styrene, methacrylate, vinylpyridine, vinylcyclohexane, imide, amide, propylene, alphamethylstyrene and combinations thereof. The first lamellar domain and the second lamellar domain may contain a plurality of linear block copolymers, which may be diblock or triblock copolymers.

In one embodiment of the invention, a cathode contains at least SPAN cathode active material, an electronically conducting agent, and a first polymer electrolyte with a lithium salt, all mixed together. There may be a layer of a second polymer electrolyte on the surface of the cathode film that faces the separator layer in the battery. In one arrangement, the first polymer electrolyte and the second polymer electrolyte are the same. There may also be a current collector on the surface of the cathode film that faces away from the separator.

The SPAN material may be mixed with one or more additives such as any of carbon, silica, aluminum oxide, and titanium dioxide, to form a sulfur composite.

The electronically conductive agent may be any of carbon black, graphite, conductive carbons, and conductive polymers. Exemplary conductive polymers include polythiophene, polyphenylene vinylene, polypyrrole, polyphenylene sulfide, and cyclized polyacrylonitrile.

In one arrangement, the cathode contains no fluorinated polymers.

The first polymer electrolyte may be a solid block copolymer that is either a diblock copolymer or a triblock copolymer. The first block of the diblock or triblock copolymer may be ionically conductive, such polyethers, polyamines, polyimides, polyamides, poly(alkyl carbonates), polynitriles, polysiloxanes, polyphosphazenes, polyolefins, polydienes, and combinations thereof. The first block of the diblock or triblock copolymer may be an ionically-conductive comb polymer that has a backbone and pendant groups. The backbone may be any of polysiloxanes, polyphosphazines, polyethers, polydienes, polyolefins, polyacrylates, polymethacrylates, and combinations thereof. The pendants may be any of oligoethers, substituted oligoethers, nitrile groups, sulfones, thiols, polyethers, polyamines, polyimides, polyamides, poly(alkyl carbonates), polynitriles, other polar groups, and combinations thereof.

The second block of the diblock or triblock copolymer may be any of polystyrene, hydrogenated polystyrene, polymethacrylate, poly(methyl methacrylate), polyvinylpyridine, polyvinylcyclohexane, polyimide, polyamide, polypropylene, polyolefins, poly(t-butyl vinyl ether), poly(cyclohexyl methacrylate), poly(cyclohexyl vinyl ether), poly(t-butyl vinyl ether), polyethylene, fluorocarbons, polyvinylidene fluoride, and copolymers that contain styrene, methacrylate, and/or vinylpyridine.

At least one of the first polymer electrolyte and the second polymer electrolyte may sequester sulfur or lithium polysulfide by chemical bonding. At least one of the first polymer electrolyte and the second polymer electrolyte may contain an ionically conductive polymer that includes an olefinic group capable of polysulfide addition and an electrolyte salt. In one arrangement, the ionically conductive polymer includes a first monomer and a second monomer: the first monomer is ionically conductive and the second monomer contains an olefinic group capable of polysulfide addition. The ionically conductive monomer may be any of ethylene oxides, acrylonitriles, phosphoesters, ethers, amines, imides, amides, alkyl carbonates, nitriles, siloxanes, phosphazines, olefins, dienes, and combinations thereof. The olefinic group may be an allyl group, such as an allyloxymethyl and a vinyl group. In one arrangement, at least one of the first polymer electrolyte and the second polymer electrolyte contains a radical-generating species, such as any of bromine, TEMPO ((2,2,6,6-Tetramethylpiperidin-1-yl)oxy or (2,2,6,6-tetramethylpiperidin-1-yl)oxidanyl) groups, and pendant methacrylate groups.

At least one of the first polymer electrolyte and the second polymer electrolyte may be configured to sequester sulfur or lithium polysulfide physically. At least one of the first polymer electrolyte and the second polymer electrolyte may contain a molecule that has a polymer backbone to which polar groups are attached. The backbone may be a polyether molecule that has cyclic carbonates grafted as side groups (P(GC-EO)). The polymer backbone may be any of (P(GN-EO), P(GP-EO)), polyalkanes, polyphosphazenes, and polysiloxanes and the polar groups are can be either nitrile groups (GN) or phosphonate groups (GP). The polar groups may be poly phosphorus esters. At least one of the first polymer electrolyte and the second polymer electrolyte may contain a linear copolymer of carbonates, ethylene oxide (P(LC-EO)), or analogs of P(LC-EO) that incorporate thioethers linkages in addition to ether linkages (P(LC-TEO)). At least one of the first polymer electrolyte and the second polymer electrolyte may contain a polyelectrolyte, such as $Cl^-$, $TFSI^-$, $BETI^-$, $ClO_4^-$, $BF_4^-$, $PF_6^-$, $Triflate^-$, or $BOB^-$. At least one of the first polymer electrolyte and the second polymer electrolyte may contain an anionic polymer, such as any of Nafion®, poly(styrene sulfonate), polyvinyl and sulfonate.

DETAILED DESCRIPTION

The preferred embodiments are illustrated in the context of lithium metal-sulfur electrochemical cells. The skilled artisan will readily appreciate, however, that the materials and methods disclosed herein will have application in a number of other contexts where diffusion of sulfur or polysulfides is undesirable.

All publications referred to herein are incorporated by reference in their entirety for all purposes as if fully set forth herein.

In the embodiments of the invention, a lithium metal battery that has a sulfur-based cathode and a sulfur-sequestering electrolyte is disclosed. The electrolyte may be internal to the cathode or it may form a coating between the cathode and the separator. The sulfur-sequestering electrolyte may act in any of a few different ways. It may prevent formation and diffusion of unbound lithium polysulfide and/or elemental sulfur. The sequestration may be physical or it may be chemical. Beneficial aspects of such a battery include high specific capacity and long cycle life.

In this disclosure, the terms "negative electrode" and "anode" are both used to mean "negative electrode." Likewise, the terms "positive electrode" and "cathode" are both used to mean "positive electrode."

The term "separator" is used herein to mean either:
  a permeable membrane placed between a battery's anode and cathode, which is filled with a liquid or gel electrolyte, or
  the region between a battery's anode and cathode, which is filled with a solid electrolyte membrane.

The term "solid polymer" is used herein to include solid homopolymers, solid random copolymers and solid block copolymers.

High Energy Cell with Lithium Metal and SPAN Electrodes

In one embodiment of the invention, a cell design combines a lithium metal anode, a block copolymer separator electrolyte, a composite cathode containing sulfur-bound cyclized polyacrylonitrile (SPAN), and a cathode electrolyte (catholyte) that acts as a sulfur and/or polysulfide barrier to prevent loss of elemental sulfur and/or lithium polysulfides from the cathode layer.

Generally, a cathode has at least the following components:
- an electrochemically active cathode material;
- electronically conductive additives;
- a polymeric binder to hold the active material and conductive additives in place; and
- a current collector backing the electrochemically active material.

Examples of electronically conductive additives include carbon black, graphite, vapor-grown carbon fiber (VGCF), graphene, SuperP, Printex, Ketjenblack, and carbon nanotubes (CNTs). Examples of binders include polyvinylidene fluoride (PVDF), poly(vinylidene fluoride-hexafluoropropylene) (PVDF-HFP), polyacrylonitrile (PAN), polyacrylic acid (PAA), alginate, polyethylene oxide (PEO), carboxymethyl cellulose (CMC), styrene-butadiene rubber (SBR), polypropylene oxide, and copolymers thereof. In a dry polymer battery, the polymeric binder may or may not be ionically conductive and may be accompanied by an additional polymer electrolyte (catholyte) that contains a dissolved metal salt and functions as a metal ion transporter. For lithium batteries, lithium salts are used. Typical lithium salts include lithium bis(trifluoromethanesulfonyl) imide (LiTFSI), lithium bis(perfluoroethanesulfonyl) imide (LiBETI), $LiClO_4$, $LiBF_4$, $LiPF_6$, lithium trifluoromethanesulfonate (Li triflate), and lithium bis(oxalato) borate (LiBOB). Salts of other metals can be used if other metals form the basis of the cell. Examples of such metals include Na, K, Mg, Ca, and Al.

In a sulfur-based cell, the cathode is generally fabricated in the charged state (oxidized) and requires a source of lithium. Anode choices may include lithium metal foil, lithiated graphite, lithiated silicon, or the like. Use of lithium metal anodes in a rechargeable cell requires a specialized separator that is chemically stable to lithium as well as capable of preventing dendritic growth during charging. Block copolymer electrolytes provide a means of achieving the required mechanical strength and ionic conductivity.

The separator layer between the anode and cathode is an ionically conductive, but electronically insulative layer. Such a layer may be a liquid-electrolyte-soaked porous plastic membrane in conventional lithium-ion cells or a solid polymer electrolyte coating in dry polymer cells. Combinations of these are also possible. For a polymer electrolyte such as PEO that is a viscous liquid or gel with poor mechanical properties, greater mechanical strength can be achieved by forming block copolymers that have a first PEO polymer block that is ionically conductive and a second polymer block that is mechanically-stabilizing. In order for the second block to provide mechanical stability, the cell is operated at a temperature below the melting temperature ($T_m$) for crystalline polymers or the glass transition temperature ($T_g$) for amorphous polymers.

Nanostructured Block Copolymer Electrolytes

FIG. 1A is a simplified illustration of an exemplary diblock polymer molecule 100 that has a first polymer block 110 and a second polymer block 120 covalently bonded together. In one arrangement both the first polymer block 110 and the second polymer block 120 are linear polymer blocks. In another arrangement, either one or both polymer blocks 110, 120 has a comb (or branched) structure. In one arrangement, neither polymer block is cross-linked. In another arrangement, one polymer block is cross-linked. In yet another arrangement, both polymer blocks are cross-linked.

Figure 1B:
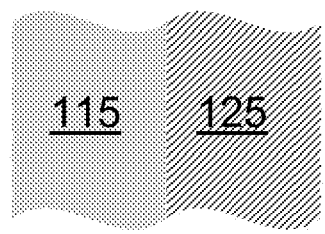
FIG. 1B is a schematic drawing that shows how multiple diblock copolymer molecules, as shown in FIG. 1A, arrange themselves into a domain structure, according to an embodiment of the invention.
Figure 1C:
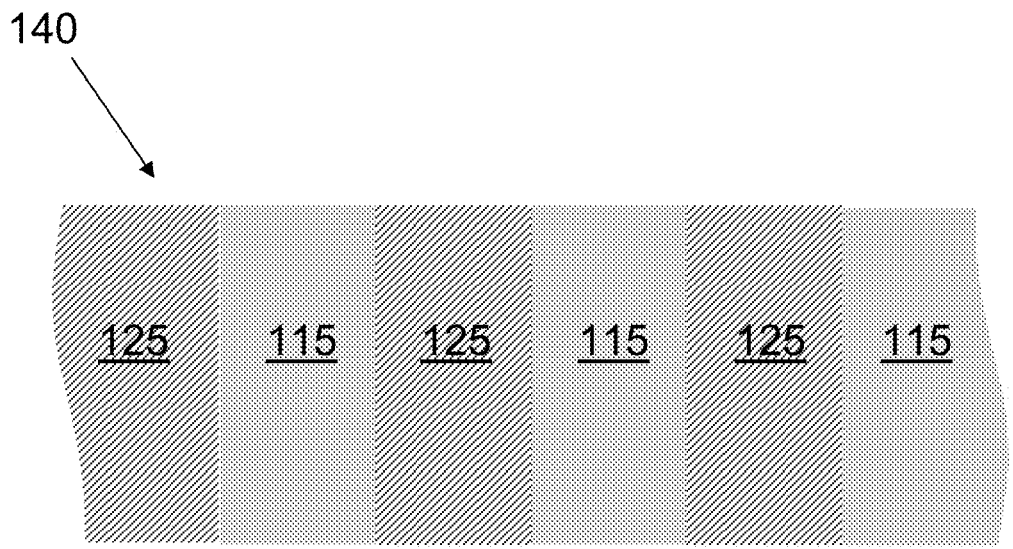
FIG. 1C is a schematic drawing that shows how multiple repeat domains, as shown in FIG. 1B, form a continuous nanostructured block copolymer material, according to an embodiment of the invention.

Multiple diblock polymer molecules 100 can arrange themselves to form a first domain 115 of a first phase made of the first polymer blocks 110 and a second domain 125 of a second phase made of the second polymer blocks 120, as shown in FIG. 1B. Diblock polymer molecules 100 can arrange themselves to form multiple repeat domains, thereby forming a continuous nanostructured block copolymer material 140, as shown in FIG. 1C. The sizes or widths of the domains can be adjusted by adjusting the molecular weights of each of the polymer blocks.

In one arrangement the first polymer domain 115 is ionically conductive, and the second polymer domain 125 provides mechanical strength to the nanostructured block copolymer.

Figure 2A:
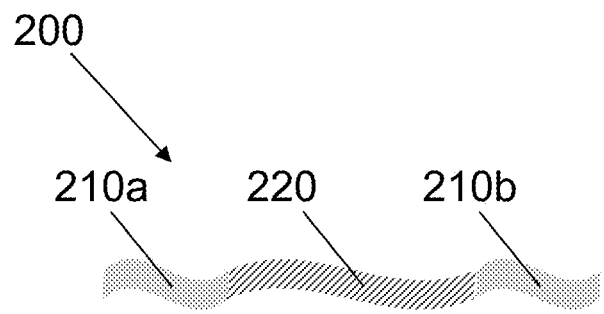
FIG. 2A is a schematic drawing of a triblock copolymer molecule that includes two different polymer blocks, according to an embodiment of the invention.

FIG. 2A is a simplified illustration of an exemplary triblock polymer molecule 200 that has a first polymer block 210a, a second polymer block 220, and a third polymer block 210b that is the same as the first polymer block 210a, all covalently bonded together. In one arrangement the first polymer block 210a, the second polymer block 220, and the third copolymer block 210b are linear polymer blocks. In another arrangement, either some or all polymer blocks 210a, 220, 210b have a comb (or branched) structure. In one arrangement, no polymer block is cross-linked. In another arrangement, one polymer block is cross-linked. In yet another arrangement, two polymer blocks are cross-linked. In yet another arrangement, all polymer blocks are cross-linked.

Figure 2B:
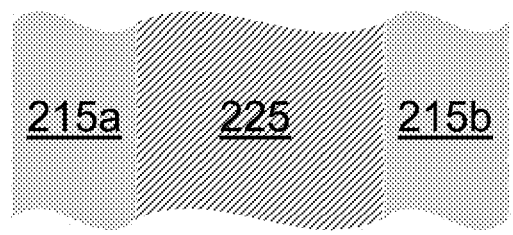
FIG. 2B is a schematic drawing that shows how multiple triblock copolymer molecules, as shown in FIG. 2A, arrange themselves into a domain structure, according to an embodiment of the invention.
Figure 2C:
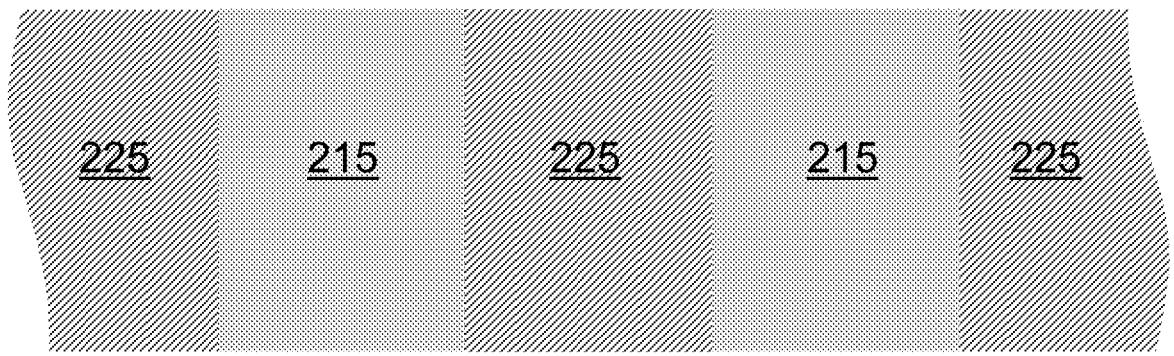
FIG. 2C is a schematic drawing that shows how multiple repeat domains, as shown in FIG. 2B, form a continuous nanostructured block copolymer material, according to an embodiment of the invention.

Multiple triblock polymer molecules 200 can arrange themselves to form a first domain 215 of a first phase made of the first polymer blocks 210a, a second domain 225 of a second phase made of the second polymer blocks 220, and a third domain 215b of a first phase made of the third polymer blocks 210b as shown in FIG. 2B. Triblock polymer molecules 200 can arrange themselves to form multiple repeat domains 225, 215 (containing both 215a and 215b), thereby forming a continuous nanostructured block copolymer 230, as shown in FIG. 2C. The sizes of the domains can be adjusted by adjusting the molecular weights of each of the polymer blocks.

In one arrangement the first and third polymer domains 215a, 215b are ionically conductive, and the second polymer domain 225 provides mechanical strength to the nanostructured block copolymer. In another arrangement, the second polymer domain 225 is ionically conductive, and the first and third polymer domains 215 provide a structural framework.

Figure 3A:
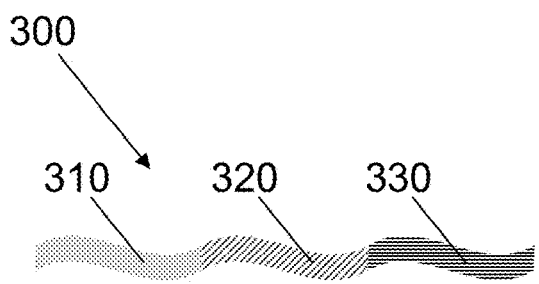
FIG. 3A is a schematic drawing of a triblock copolymer molecule that includes three different polymer blocks, according to an embodiment of the invention.

FIG. 3A is a simplified illustration of another exemplary triblock polymer molecule 300 that has a first polymer block 310, a second polymer block 320, and a third polymer block 330, different from either of the other two polymer blocks, all covalently bonded together. In one arrangement the first polymer block 310, the second polymer block 320, and the third copolymer block 330 are linear polymer blocks. In another arrangement, either some or all polymer blocks 310, 320, 330 have a comb (or branched) structure. In one arrangement, no polymer block is cross-linked. In another arrangement, one polymer block is cross-linked. In yet another arrangement, two polymer blocks are cross-linked. In yet another arrangement, all polymer blocks are cross-linked.

Figure 3B:
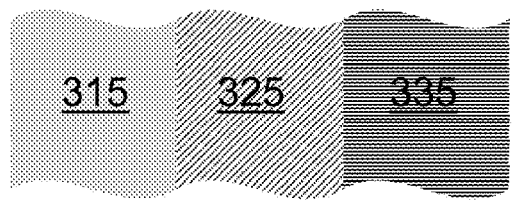
FIG. 3B is a schematic drawing that shows how multiple triblock copolymer molecules, as shown in FIG. 3A, arrange themselves into a domain structure, according to an embodiment of the invention.
Figure 3C:
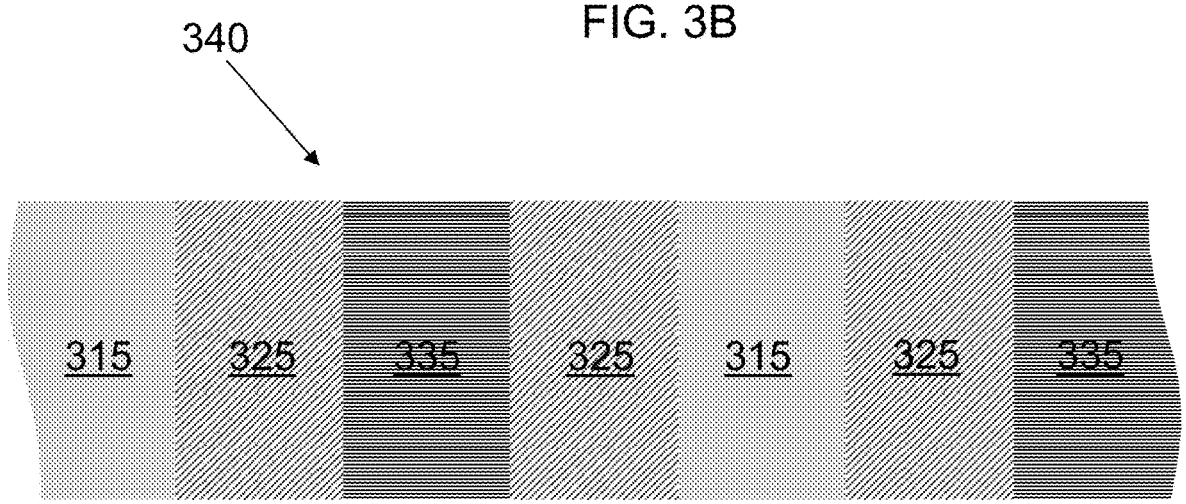
FIG. 3C is a schematic drawing that shows how multiple repeat domains, as shown in FIG. 3B, form a continuous nanostructured block copolymer material, according to an embodiment of the invention.

Multiple triblock polymer molecules 300 can arrange themselves to form a first domain 315 of a first phase made of the first polymer blocks 310a, a second domain 325 of a second phase made of the second polymer blocks 320, and a third domain 335 of a third phase made of the third polymer blocks 330 as shown in FIG. 3B. Triblock polymer molecules 300 can arrange themselves to form multiple repeat domains, thereby forming a continuous nanostructured block copolymer 340, as shown in FIG. 3C. The sizes of the domains can be adjusted by adjusting the molecular weights of each of the polymer blocks.

In one arrangement the first polymer domains 315 are ionically conductive, and the second polymer domains 325 provide mechanical strength to the nanostructured block copolymer. The third polymer domains 335 provides an additional functionality that may improve mechanical strength, ionic conductivity, chemical or electrochemical stability, may make the material easier to process, or may provide some other desirable property to the block copolymer. In other arrangements, the individual domains can exchange roles.

Choosing appropriate polymers for the block copolymers described above is important in order to achieve desired electrolyte properties. In one embodiment, the conductive polymer (1) exhibits ionic conductivity of at least $10^{-5}$ $Scm^{-1}$ at electrochemical cell operating temperatures when combined with an appropriate salt(s), such as lithium salt(s); (2) is chemically stable against such salt(s); and (3) is thermally stable at electrochemical cell operating temperatures. In one embodiment, the structural material has a modulus in excess of $1 \times 10^5$ Pa at electrochemical cell operating temperatures. In one embodiment, the third polymer (1) is rubbery; and (2) has a glass transition temperature lower than operating and processing temperatures. It is useful if all materials are mutually immiscible.

In one embodiment of the invention, the conductive phase can be made of a linear or branched polymer. Conductive linear or branched polymers that can be used in the conductive phase include, but are not limited to, polyethers, polyamines, polyimides, polyamides, alkyl carbonates, polynitriles, and combinations thereof. The conductive linear or branched polymers can also be used in combination with polysiloxanes, polyphosphazines, polyolefins, and/or polydienes to form the conductive phase.

In another exemplary embodiment, the conductive phase is made of comb (or branched) polymers that have a backbone and pendant groups. Backbones that can be used in these polymers include, but are not limited to, polysiloxanes, polyphosphazines, polyethers, polydienes, polyolefins, polyacrylates, polymethacrylates, and combinations thereof. Pendants that can be used include, but are not limited to, oligoethers, substituted oligoethers, nitrile groups, sulfones, thiols, polyethers, polyamines, polyimides, polyamides, alkyl carbonates, polynitriles, other polar groups, and combinations thereof.

Further details about polymers that can be used in the conductive phase can be found in International Patent Application Number PCT/US09/45356, filed May 27, 2009 (PCT Publication WO2009146340 published Dec. 3, 2009), International Patent Application Number PCT/US09/54709, filed Aug. 22, 2009 (U.S. Pat. No. 8,691,928 issued Apr. 8, 2014), International Patent Application Number PCT/US10/21065, filed Jan. 14, 2010 (PCT Publication WO2010083325 published Jul. 22, 2010), International Patent Application Number PCT/US10/21070, filed Jan. 14, 2010 (PCT Publication WO2010083330 published Jul. 22, 2010), U.S. International Patent Application Number PCT/US10/25680, filed Feb. 26, 2009 (PCT Publication WO2010101791 published Sep. 10, 2010), and International Patent Application Number PCT/US10/25690, filed Feb. 26, 2009 (U.S. Pat. No. 8,598,273 issued Dec. 3, 2013, all of which are included by reference herein.

There are no particular restrictions on the electrolyte salt that can be used in the block copolymer electrolytes. Any electrolyte salt that includes the ion identified as the most desirable charge carrier for the application can be used. It is especially useful to use electrolyte salts that have a large dissociation constant within the polymer electrolyte.

Suitable examples include alkali metal salts, such as Li salts. Examples of useful Li salts include, but are not limited to, $LiPF_6$, $LiN(CF_3SO_2)_2$, $Li(CF_3SO_2)_3C$, $LiN(SO_2CF_2CF_3)_2$, $LiB(C_2O_4)_2$, $Li_2B_{12}F_xH_{12-x}$, $Li_2B_{12}F_{12}$, and mixtures thereof.

In one embodiment of the invention, single ion conductors can be used with electrolyte salts or instead of electrolyte salts. Examples of single ion conductors include, but are not limited to sulfonamide salts, boron based salts, and sulfates.

In one embodiment of the invention, the structural phase can be made of glassy or crystalline polymers such as polystyrene, hydrogenated polystyrene, polymethacrylate, poly(methyl methacrylate), polyvinylpyridine, polyvinylcyclohexane, polyimide, polyamide, polypropylene, poly (2,6-dimethyl-1,4-phenylene oxide) (PXE), polyolefins, poly(t-butyl vinyl ether), poly(cyclohexyl methacrylate), poly (cyclohexyl vinyl ether), polyethylene, fluorocarbons, such as polyvinylidene fluoride, or copolymers that contain styrene, methacrylate, or vinylpyridine.

Additional species can be added to nanostructured block copolymer electrolytes to enhance the ionic conductivity, to enhance the mechanical properties, or to enhance any other properties that may be desirable.

The ionic conductivity of nanostructured block copolymer electrolyte materials can be improved by including one or more additives in the ionically conductive phase. An additive can improve ionic conductivity by lowering the degree of crystallinity, lowering the melting temperature, lowering the glass transition temperature, increasing chain mobility, or any combination of these. A high dielectric additive can aid dissociation of the salt, increasing the number of Li+ ions available for ion transport, and reducing the bulky Li+[salt] complexes. Additives that weaken the interaction between Li+ and PEO chains/anions, thereby making it easier for Li+ ions to diffuse, may be included in the conductive phase. The additives that enhance ionic conductivity can be broadly classified in the following categories: low molecular weight conductive polymers, ceramic particles, room temp ionic liquids (RTILs), high dielectric organic plasticizers, and Lewis acids.

Other additives can be used in the polymer electrolytes described herein. For example, additives that help with overcharge protection, provide stable SEI (solid electrolyte interface) layers, and/or improve electrochemical stability can be used. Such additives are well known to people with ordinary skill in the art. Additives that make the polymers easier to process, such as plasticizers, can also be used.

Further details about block copolymer electrolytes are described in U.S. patent application Ser. No. 12/225,934, filed Oct. 1, 2008 (U.S. Pat. No. 8,563,168 issued Oct. 22, 2013), U.S. patent application Ser. No. 12/271,829, filed Nov. 14, 2008 (U.S. Pat. No. 8,268,197 issued Sep. 18, 2012, and International Patent Application Number PCT/US09/31356, filed Jan. 16, 2009 (U.S. Pat. No. 8,889,301 issued Nov. 18, 2014), all of which are included by reference herein.

SPAN Cathode Active Material

If the cathode of a lithium-sulfur cell consisted completely of elemental sulfur, in theory, an energy density of more than 1,000 Wh/kg could be achieved. However, sulfur is neither ionically nor electrically conductive, so a sulfur cathode includes additives that supply these properties and which lower the energy density. In addition, during the discharge of a lithium-sulfur cell, elemental sulfur is usually reduced to soluble polysulfides. The polysulfides can diffuse into other regions of the cell (and can even reach the anode), where they are no longer able to participate in the electrochemical reactions of subsequent charge/discharge cycles. In addition, polysulfides may be dissolved in the electrolyte, where they cannot be reduced further. Therefore, at present, the energy density of lithium-sulfur cells is much lower than the theoretical value, and is estimated to be between 400 Wh/kg and 600 Wh/kg. Even worse, the service life of lithium-sulfur cells may be limited to as few as 100 complete cycles or even less. Cycle life may be affected by diffusion of polysulfides from the cathode to the anode where they can react with the lithium metal anode and shorten its life. Sulfur utilization in lithium-sulfur battery cells can be significantly increased when the sulfur is bound to cyclized polyacrylonitrile. Thus it is advantageous to use polyacrylonitrile-sulfur (SPAN) composite as a cathode active material.

In one embodiment, the cathode active material contains a polyacrylonitrile-sulfur (SPAN) composite. SPAN is a composite material that is produced by reacting polyacrylonitrile (PAN) with sulfur (S). SPAN material has sulfur-carbon bonds which can bond polysulfides to the SPAN polymer matrix. In such a SPAN composite, the sulfur is fixedly bonded to a polymer structure on a sub-nanometer/nanometer scale. In addition the sulfur is finely or homogeneously distributed within the SPAN structure. SPAN has been shown to offer good cycling stability with a high sulfur utilization rate. In addition, SPAN has shown such good performance even at high discharge rates (C rates).

In one embodiment of the invention, SPAN is produced by reacting polyacrylonitrile with an excess of sulfur at a temperature greater than or equal to 300° C. In some arrangements, temperatures greater than or 550° C. are used. The ratio of excess sulfur to polyacrylonitrile that is used depends on the reaction temperature. The sulfur atoms may be in the polyacrylonitrile-sulfur composite material both directly by covalent sulfur-carbon bonds, as well as indirectly through one or more covalent bonds, sulfur-sulfur and one or more sulfur-carbon bonds may be connected to a particular cyclized polyacrylonitrile. In this case, at least a portion of the sulfur atoms of the SPAN composite material, for example in the form of polysulfides, is covalently linked to a cyclized polyacrylonitrile. In such composite materials are indications of sulfur-carbon bond, which tie the polysulfides to the polymer matrix. Consequently, there is a sulfur polyacrylonitrile composite having various functional groups and chemical bonds, which can all have different properties with respect to electrochemical performance, and aging behavior.

In another embodiment of the invention, SPAN composite material is produced by (a) converting polyacrylonitrile to cyclized polyacrylonitrile, and (b) converting the cyclized polyacrylonitrile with sulfur to form a polyacrylonitrile-sulfur composite material. In step (a), an electrically conductive cyclized polyacrylonitrile (cPAN) base is formed. In step (b), the cPAN is reacted with electrochemically active sulfur takes place, bonding the sulfur covalently to the electrically conductive skeleton of the cPAN, thus forming polyacrylonitrile-sulfur composite material (SPAN). By using a two-step method, reaction conditions can be optimized for each partial reaction. It may be interesting to note that step (a) is similar to a dehydrogenation reaction known from the preparation of carbon fiber, and step (b) is similar to a reaction from a different technical field, namely the vulcanization reaction of rubber.

This cell design has numerous embodiments related to different architectural configurations of a barrier catholyte as well as numerous mechanistic processes for preventing loss of sulfur and/or polysulfides. Different catholyte materials or additives can be used to capture sulfur species and prevent capacity fade.

The embodiments of the invention include various solid polymer electrolyte materials that can be used as active or passive barriers to prevent sulfur/polysulfide loss. Such polymers may or may not be cross-linked. In general the disclosed materials and related mechanism for preventing sulfur loss can be classified into two groups: active (or chemical) and passive (or physical) barriers to prevent sulfur/polysulfide loss. It should be understood that for any such polymer material disclosed below, various structural configurations are possible. For example, the monomers that make up any such polymer may be organized as random copolymers or in blocks to make block copolymer structures. In addition, the polymers (and the monomers therein) disclosed below may be combined with yet other polymers to form random copolymer or block copolymer structures.

In a solid-state lithium polymer battery, olefinic groups are included in the polymer used as an ionically conductive binder in a sulfur-based cathode. During operation of the battery, the olefinic groups are positioned to rapidly react with any free lithium polysulfide species that are formed, forming stable carbon-sulfur bonds and preventing further migration of the polysulfide species. Depending on the identity of the polysulfide species, it may be possible to continue lithium redox cycles at moderately reduced capacity relative to the original cathode; regardless, the polysulfide species is prevented from diffusing to the anode and causing higher internal resistance to ion flow.

In an operating lithium-sulfur cell, lithium polysulfides are formed as intermediates in the reduction of elemental sulfur in the cathode to dilithium sulfide:

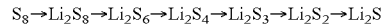

$$S_8 \rightarrow Li_2S_8 \rightarrow Li_2S_6 \rightarrow Li_2S_4 \rightarrow Li_2S_3 \rightarrow Li_2S_2 \rightarrow Li_2S$$

The leftmost and rightmost species in this sequence ($S_8$, $Li_2S_2$, and $Li_2S$) have low solubilities in most ionically conductive media and therefore form immobilized solid precipitates. The polysulfide species shown in bold tend to dissolve in ionically conductive media, and then diffuse away in electrolyte from their point of origin in the cathode. When they diffuse far enough from the cathode into the separator between the cathode and anode, they lose electrical contact with the cathode and cannot be reduced further, resulting in an irreversible loss of cell capacity. If these species diffuse across the entire separator and reach the anode, they are likely to be spontaneously, fully reduced to dilithium sulfide. This reaction both degrades the anode material itself and forms an inhibiting layer of precipitated dilithium sulfide at the anode surface, further degrading cell performance.

Prevention of the diffusion of polysulfide species is a major hurdle in the development of lithium-sulfur batteries with long cycle life. Most reported research involves the creation of sulfur composites that form the active material of the cathode. Nanostructured layers of carbon, titanium dioxide, or other materials can form barriers around sulfur particles that limit the diffusion of polysulfide species, increasing the stability and lifetime of cells, though there is some appreciable loss of capacity due to the inclusion of inactive components in the cathode. Depending on the complexity of the nanostructured composites, scaling up to commercial quantities may be more or less practical and successful in creating "contained sulfur."

A cathode has of multiple components, the active material being only one. Generally, a cathode also has a polymeric binder to hold active material particles in place on a current collector backing, and an electrically conductive additive such as carbon black, graphite, or vapor-grown carbon fiber (VGCF) to ensure electrical connectivity to all of the active material particles. In a dry polymer battery, the polymeric binder must also function as a lithium ion transporter, and will contain some amount of a dissolved lithium salt. The separator layer between the anode and cathode is also essential to the operation of a cell as an ionically conductive but electrically insulative layer. The separator may be a liquid-electrolyte-soaked porous plastic layer in conventional lithium-ion cells or a solid plastic coating in dry polymer cells, or some combination thereof. All components of a lithium-sulfur cell may provide additional opportunities to stabilize the operation of lithium-sulfur batteries.

Active Barriers for Lithium Polysulfides

In one embodiment, a catholyte polymer is an active polysulfide barrier that captures unbound lithium polysulfides by chemical reaction (actively). During operation of a battery cell, reactive groups of the catholyte are available to react rapidly with any free lithium polysulfide species that are generated, forming stable carbon-sulfur bonds, thus sequestering the polysulfides and preventing migration of the polysulfide species away from the cathode. Depending on the particular polysulfide species that are sequestered, there may still be enough capacity left in the cathode that the battery can continue to cycle at an acceptable, though reduced capacity relative to the original cathode.

In one example of the invention the catholyte is an epichlorohydrin-ethylene oxide copolymer (P(EC-EO)). The structure of P(EC-EO) is:

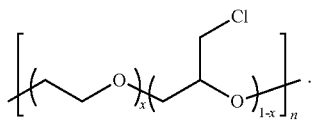

wherein n is the total number of repeat units, and x is the mole fraction of EO units, leaving 1−x as the mole fraction of EC units. Values of x can range from 0 to 0.99, and values of n can range from about 10 to 200,000 or greater. P(EC-EO) can be dissolved in common organic solvents, and the solution can be useful for forming coatings. The structure of P(EC-EO) represents a perturbation of the poly(ethylene oxide) homopolymer, which is a known lithium ion conductor when mixed with a lithium salt. The pendant chloromethyl groups derived from the epichlorohydrin monomers only modestly decrease the lithium ion conductivity of the polymer relative to PEO homopolymer, as long as the mole ratio of EC (1−x) is kept low (e.g., 0<1−x<0.5).

The pendant chloromethyl group of the EC portion of P(EC-EO) is electrophilic, meaning that a nucleophilic unit ("Nu−") can displace a chloride ion while forming a new bond to the adjacent carbon atom:

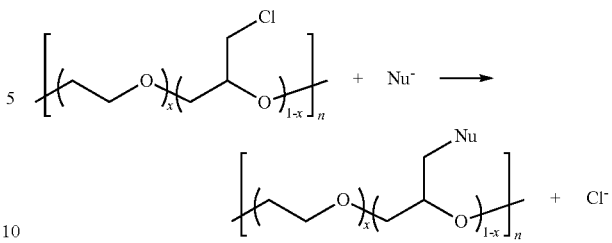

Unbound lithium polysulfide species generated during operation of lithium-sulfur batteries (general formula "$Li_mS_y$", m=1 or 2, y=3 to 8) are known to be good nucleophiles. If they are formed in the cathode in the presence of a P(EC-EO) binder, it is highly likely that reactions similar to the following will take place (as a spectator ion, $Li^+$ is not included in the reaction):

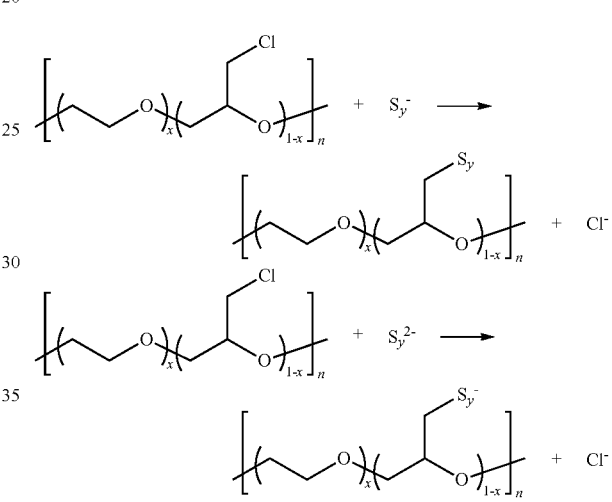

The substitution reaction is expected to be permanent: the C—S bond does not break under normal cell operating conditions. The polysulfide species has thus been trapped in the cathode, is still in electrical contact with the cathode, and cannot migrate or diffuse to the anode. The formation of the C—S bond causes an irreversible loss in cathode capacity as the sulfur can no longer be fully oxidized, but this loss is smaller than what would result from diffusion of the entire polysulfide species away from the cathode. Therefore, a sulfur or sulfur composite cathode formulated with some portion of a P(EC-EO) polymer has higher stability than one made without, due to the reduced diffusion of lithium polysulfide species away from the cathode.

While the above describes one example, there are other structures that satisfy general criteria of an electrophilic group susceptible to nucleophilic substitution incorporated into an ionically conductive polymer. The P(EC-EO) structure can be generalized to

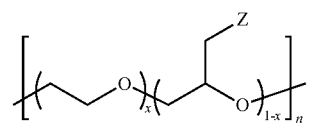

in which the electrophilic methyl group is substituted with, for example, Z=chloride, bromide, iodide, methanesulfonate, p-methyltoluenesulfonate, or p-nitrobenzenesulfonate. These can be synthesized using precursors such as epichlorohydrin, epibromohydrin, and glycidol. Other halide-bearing structures exhibit a similar capability to undergo nucleophilic substitution, such as vinyl-chloride monomer groups.

PEG-brush polyacrylates and polymethacrylates of the following structure satisfy similar criteria, wherein the PEG side chains provide ionic conductivity and alternative side chains provide the electrophilic component:

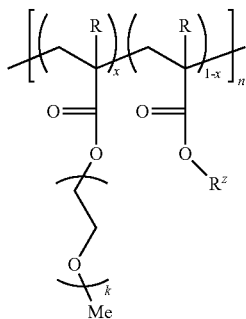

in which R=H (acrylate) or Me (methacrylate), x is the mole ratio of the PEG monomer component ranging from values of 0 to 0.99, n has the same values as above, $2<k<50$ is the number of repeat units in the PEG side chain, and $R^Z$ is an electrophilic group susceptible to substitution by polysulfide such as: 2-chloroethyl, 2-bromoethyl, ω-chloropoly(ethylene glycol), ω-bromopoly(ethylene glycol), ω-methanesulfonatopoly(ethylene glycol), ω-(p-toluenesulfonato)poly(ethylene glycol), glycidyl, or ω-glycidylpoly(ethylene glycol).

PEG-brush poly(vinyl ethers) of the following structure satisfy similar criteria, wherein the PEG side chains provide ionic conductivity and alternative side chains provide the electrophilic component:

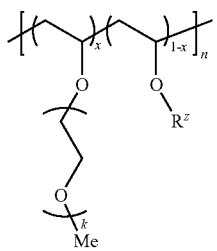

in which x is the mole ratio of the PEG monomer component having the same values as above, n has the same values as above, $2<k<50$ is the number of repeat units in the PEG side chain, and $R^Z$ is an electrophilic group susceptible to substitution by polysulfide such as: 2-chloroethyl, 2-bromoethyl, ω-chloropoly(ethylene glycol), ω-bromopoly(ethylene glycol), ω-methanesulfonatopoly(ethylene glycol), ω-(p-toluenesulfonato)poly(ethylene glycol), glycidyl, or ω-glycidylpoly(ethylene glycol).

PEG-brush polyphosphazenes and PEG-brush polycarbonates can follow similar substitution patterns:

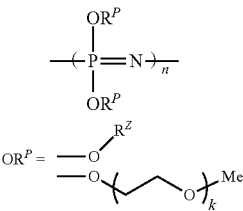

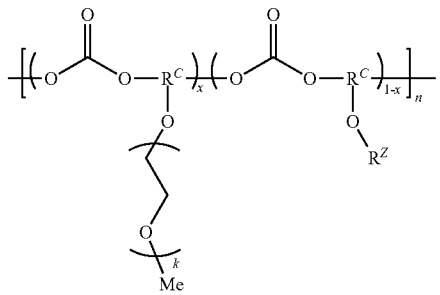

in which x, k, n, and $R^Z$ are as defined previously, and $R^C$ is a short alkyl chain, a short alkyl chain bearing an acyl side group, or a short PEG chain.

Polyphosphoesters can also be included of the type:

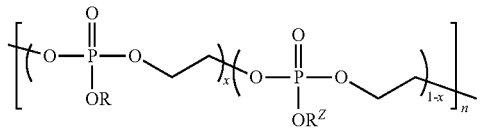

in which R=alkyl $C_1$-$C_4$, $R^Z$ and n are as defined previously, and x and 1−x are the mole ratios of the monomers defined previously. These polymers are differentiated by the reactivity of the phosphoester backbone, as a polysulfide nucleophile could, by substitution, cleave C—O bonds in the backbone or the —OR group instead of reacting only with the electrophilic $R^Z$ side chain.

Polyacrylonitrile can be copolymerized with chlorinated vinyl monomers to make polymers similar to:

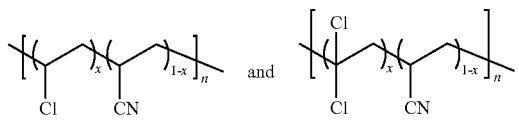 and 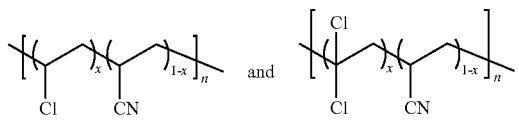

in which x and 1−x are the mole fractions of the monomers, in which x can range from 0.01 to 1. The value n is defined previously. The chloride group in the backbone can be displaced by a polysulfide nucleophile, while polyacrylonitrile is an ionically conductive polymer.

Olefin containing polymers can also be included. In one embodiment of the invention the catholyte is an allyl glycidyl ether-ethylene oxide copolymer (P(AGE-EO)). The catholyte may also be used as a cathode binder. The structure of P(AGE-EO) is:

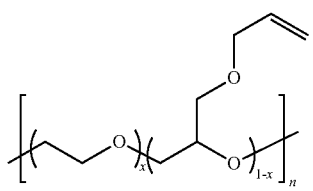

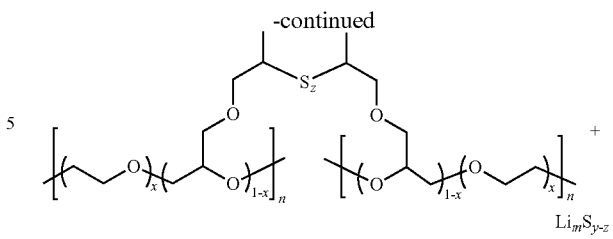

wherein n is the total number of repeat units having values defined above, and x is the mole fraction of EO units leaving 1−x as the mole fraction of AGE units, in which x can range from 0 to 0.99. The structure of P(AGE-EO) represents a perturbation of the poly(ethylene oxide) homopolymer, which is a known lithium ion conductor when mixed with a lithium salt. The pendant allyloxymethyl groups derived from the AGE monomers only modestly decrease the lithium ion conductivity of the polymer relative to PEO homopolymer, as long as the mole ratio of AGE (1−x) is kept low (e.g. 0<1−x<0.5). It is an example of an olefin, the common name for the functional group consisting of 2 carbon atoms forming a double bond. Olefins are susceptible to a number of reactions, include radical-induced polymerization, addition reactions, and cycloaddition reactions.

Lithium polysulfide species are capable of addition reactions to olefins as has been described in de Graaf, "Laboratory simulation of natural sulphurization: I. Formation of monomeric and oligomeric isoprenoid polysulphides by low-temperature reactions of inorganic polysulphides with phytol and phytadienes," *Geochim. Cosmochim. Acta* 1992, 56, 4321-4328 and in de Graaf, "Low-temperature addition of hydrogen polysulfides to olefins: formation of 2,2'-dialkyl polysulfides from alk-1-enes and cyclic (poly)sulfides and polymeric organic sulfur compounds from α,ω-dienes," *J. Chem. Soc. Perkin. Trans.* 1 1995, 635-640. This is similar to the industrial process of rubber vulcanization, in which sulfur is used to form crosslinks in natural latex (polyisoprene) as described in Carroll, "Polysulfides—Nature's organic soluble sulfur," *Phosphorus, Sulfur and Silicon and Related Elements* 1994, 95, 517-518. If polysulfides are formed in the cathode in the presence of a P(AGE-EO) binder, it is possible for reactions similar to the following to take place:

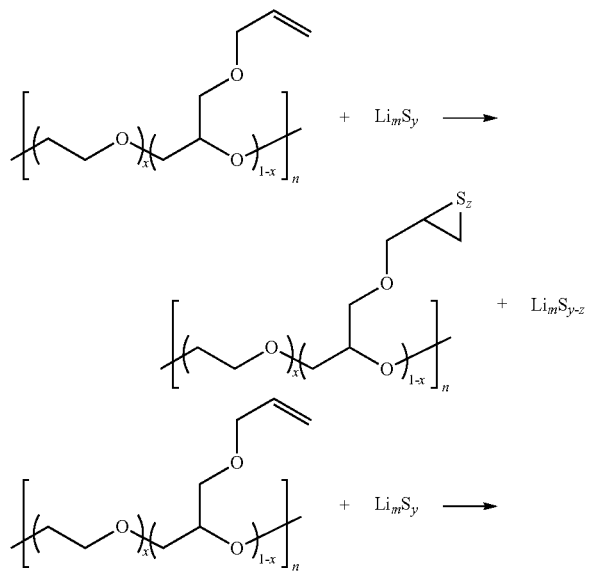

In this reaction, a portion of the polysulfide $Li_mS_y$ (m=1 or 2, y=3 to 8) reacts to form a sulfur link between carbon atoms, with a depreciated lithium polysulfide being the ω-product. The AGE-sulfur addition reactions are expected to be permanent: a C—S bond does not break under normal cell operating conditions. A portion of the polysulfide species has thus been trapped in the cathode, is still in electrical contact with the cathode, and cannot migrate or diffuse to the anode. The formation of the C—S bond causes an irreversible loss in cathode capacity as the sulfur can no longer be fully oxidized, but this loss is smaller than what would result from diffusion of the entire polysulfide species away from the cathode. The lithium polysulfide ω-product is more fully reduced than the original lithium polysulfide and is likely to be $Li_2S_2$ or $Li_2S$ species, which have poor solubility and mobility, and will therefore tend to stop diffusing out of the cathode and may be trapped by other mechanisms proposed herein. Therefore, a sulfur or sulfur composite cathode formulated with some portion of a P(AGE-EO) polymer may be expected to show higher stability than one made without, due to the reduced diffusion of lithium polysulfide species away from the cathode.

In other embodiments of the invention, various structures that have an olefinic group capable of polysulfide addition incorporated into an ionically conductive polymer can be used.

A person of ordinary skill in the art will understand that there are many other structures that satisfy general criteria of an electrophilic group or an olefinic group susceptible to polysulfide addition incorporated into an ionically conductive polymer.

Several of the polymers given as examples above exist as viscous liquids or gels with poor mechanical properties, especially if they are mixed with a plasticizing lithium salt such as LiTFSI. If greater mechanical strength is desired, it is possible to form block copolymers wherein a first polymer sequence serves as the ionic conductor and polysulfide or sulfur trap as described above and a second polymer sequence serves as a mechanical block. Examples of suitable mechanical blocks include polystyrene, poly(methyl methacrylate), poly(cyclohexyl methacrylate). The polymers typically are chosen such that they have microphase separation behavior.

In another embodiment of the invention, an of the polymers discussed above is made into a ionic conductor by formulating it with an appropriate salt. Examples include, but are not limited to, lithium salts such as LiTFSI, LiBETI, $LiClO_4$, $LiBF_4$, $LiPF_6$, Li triflate, LiBOB, $LiPF_6$, $LiN(CF_3SO_2)_2$, $Li(CF_3SO_2)_3C$, $LiN(SO_2CF_2CF_3)_2$, $LiB(C_2O_4)_2$, $Li_2B_{12}F_xH_{12-x}$, $Li_2B_{12}F_{12}$, and mixtures thereof. In a metal other than Li is the basis of the cell, such as Na, K, Mg, Ca, Al, etc, other appropriate salts can be used, in which case the polymer is formulated with a salt of the metal that is the basis of the cell.

In one arrangement, the polymers described above are used as admixtures other known ionically conducting formulations of polymers and metal salts.

In another arrangement, the polymers described above, when formulated with a metal salt, can be used as a separator in an electrochemical cell with a sulfur-based cathode. Such a separator can improve cell performance by limiting polysulfide migration to the anode, but may allow polysulfides to diffuse away from electrical contact with the cathode which would be observed as an irreversible loss in cell capacity.

Active Barriers for Elemental Sulfur

In another embodiment, an additional active mechanism serves to capture elemental sulfur through chemical reaction (actively). If elemental sulfur is formed during charging of the battery, it can diffuse out of the cathode causing capacity loss and eventually react at the surface of the anode causing resistance increase and anode decomposition. During operation of the battery cell, reactive groups of the catholyte are positioned to react rapidly with any elemental sulfur species that are generated, forming stable carbon-sulfur bonds and preventing further migration of the sulfur species. Sulfur bound in the catholyte in this way may still be available for further electrochemical activity during cycling of the battery cell.

In one embodiment of the invention, the catholyte contains a radical-generating species that is active at operating temperatures of the cell. In one example, the catholyte contains bromine, TEMPO groups or pendant methacrylate groups. Representative examples include polymers with the following structures:

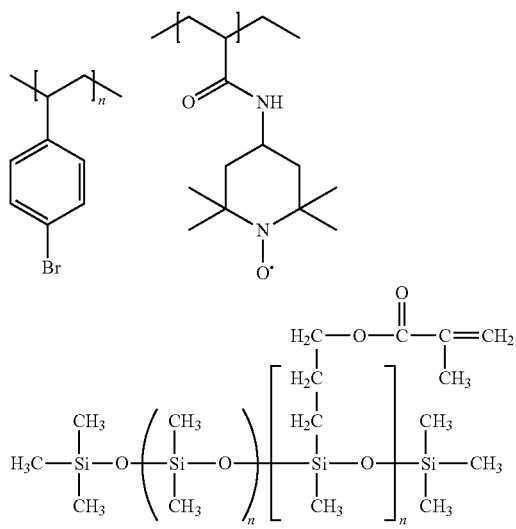

If elemental sulfur species form during operation of the cell, radical generating species such as those described herein may react with the elemental sulfur creating C—S bonds thus preventing loss of the sulfur from the cathode. The formation of the C—S bond causes an irreversible loss in cathode capacity as the sulfur can no longer be fully oxidized, but this loss is smaller than what would result from diffusion of the entire sulfur species away from the cathode. Therefore, a sulfur or sulfur composite cathode formulated with some portion of a radical forming polymer may be expected to show higher stability than one made without such a polymer, due to the reduced diffusion of sulfur species away from the cathode.

Passive Barriers for Lithium Polysulfides

In another embodiment, the cell uses a catholyte that acts as a passive (or physical) barrier to diffusion of lithium polysulfides. During discharge of the battery, free lithium polysulfide species may be generated. Due to polarity and/or specific interactions of the catholyte and the unbound lithium polysulfides, the catholyte limits the dissolution of the lithium polysulfide species forming it into a precipitate and preventing migration of the polysulfide species out of the cathode. The choice of catholyte can also affect the regioselectivity of the reduction of sulfur species. For example, proper choice of catholyte may result in formation of low index lithium polysulfides that have poorer solubility, resulting in entrapment in the cathode layer.

In one embodiment of the invention the catholyte is a polyelectrolyte or a polymerized ionic liquid. Representative examples include cationic polymers with the following structures, in which X is an anion such as Cl$^-$, TFSI$^-$, BETI$^-$, ClO$_4^-$, BF$_4^-$, PF$_6^-$, Triflate$^-$, BOB$^-$, and the like.

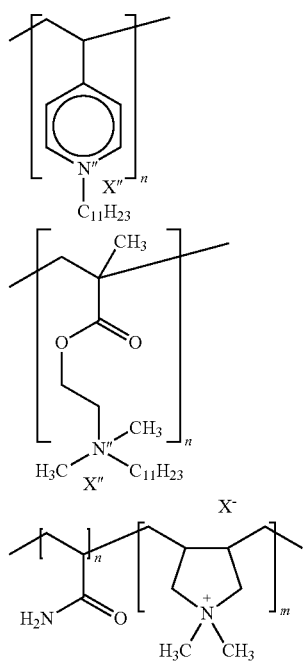

Alternative choices for catholytes that affect polysulfide formation and diffusion are anionic polymers such as Nafion®, poly(styrene sulfonate), polyvinyl sulfonate, and the like. Representative examples include anionic polymers with the following structures:

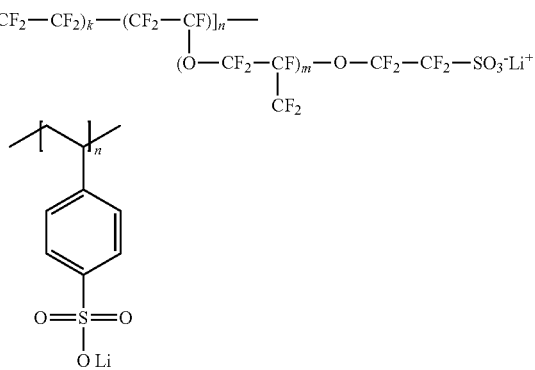

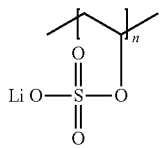

The advantage of passive barriers for lithium polysulfides as compared to active barriers is that they do not reduce the capacity of the cathode, in that no reduction of the polysulfide occurs.

Passive Barriers for Elemental Sulfur

In another embodiment, the cathode uses a catholyte that acts as a passive barrier to diffusion of elemental sulfur. During charging of the battery, free sulfur species $S_x$ (e.g., elemental sulfur) may be generated. Such a catholyte has low solubility for elemental sulfur, so there is little dissolution of the elemental sulfur species. Instead sulfur precipitates are formed, preventing migration of the sulfur species out of the cathode. Low solubility can be achieved if the catholyte is highly polar. Polarity of materials may be quantified by their dielectric constant. For example a low polarity material may have a dielectric constant of around 8 or less, while a highly polar material may have a dielectric constant greater than about 30. In one arrangement, such polarity is effected when a high concentration of salt species is dissolved in the catholyte. In another arrangement, a polymer that is intrinsically polar is used as the catholyte. For the embodiments of the invention, as disclosed herein, polar materials are considered to have low enough solubility of sulfur to be useful as physical barriers to elemental sulfur diffusion when they have a dielectric constant greater than 20, or greater than 25, or greater than 30, or any range therein.

In one embodiment of the invention the catholyte is a linear copolymer of carbonates and ethylene oxide (P(LC-EO)). In another example different analogs of P(LC-EO) can be used which incorporate thioethers linkages in addition to ether linkages (P(LC-TEO)). Examples of some structure of these types are:

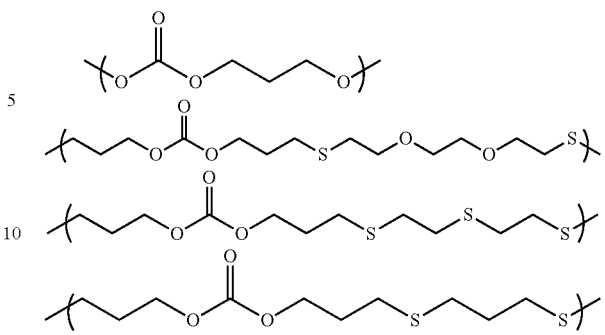

In another embodiment, polar groups are attached to a polymer backbone, resulting in increased polarity, which reduces elemental sulfur solubility. In one arrangement, the catholyte is a polyether backbone with cyclic carbonates grafted as side groups (P(GC-EO)). In another arrangement, different polar groups such as nitrile groups (GN) or phosphonate groups (GP) are grafted off the backbone polymer (P(GN-EO) or P(GP-EO)). Alternative backbones such as polyalkanes, polyphosphazenes, or polysiloxanes may be used. Representative examples of structure of these types include:

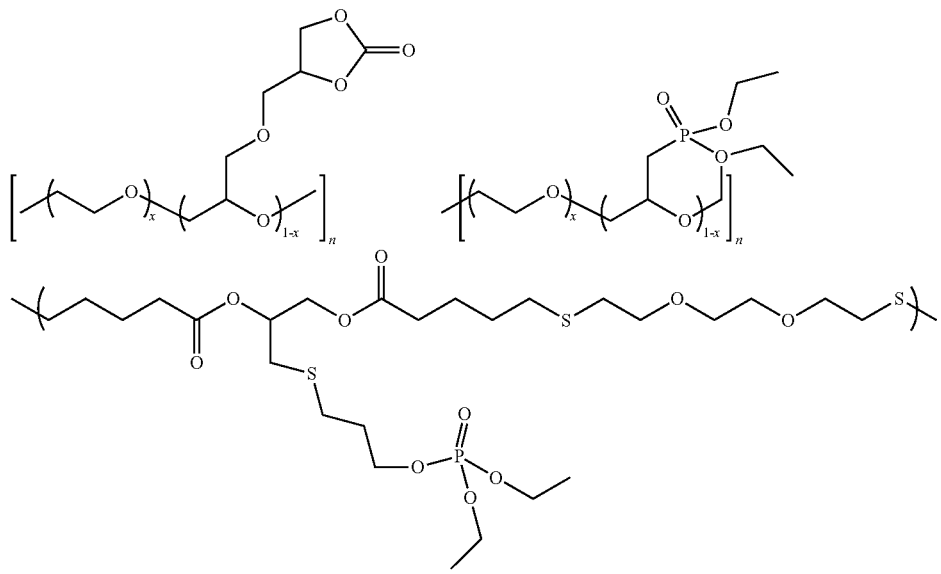

in which n and x have the values as described above.

In another embodiment, poly phosphorus esters are used as catholytes to limit elemental sulfur dissolution and diffusion. Representative examples of different structure of these types are:

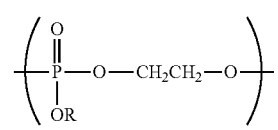

in which R=methyl, ethyl, isopropyl, 2,2,2-trifluoroethyl, etc.

Cell Architecture and Barrier Configurations

A barrier layer preventing sulfur loss from a cathode can be configured in a variety of ways. A catholyte material which prohibits diffusion of lithium polysulfides or elemental sulfur may be located in different regions of the cathode depending on its properties like conductivity, binding ability, and surface compatibility with other cell components.

Figure 4:
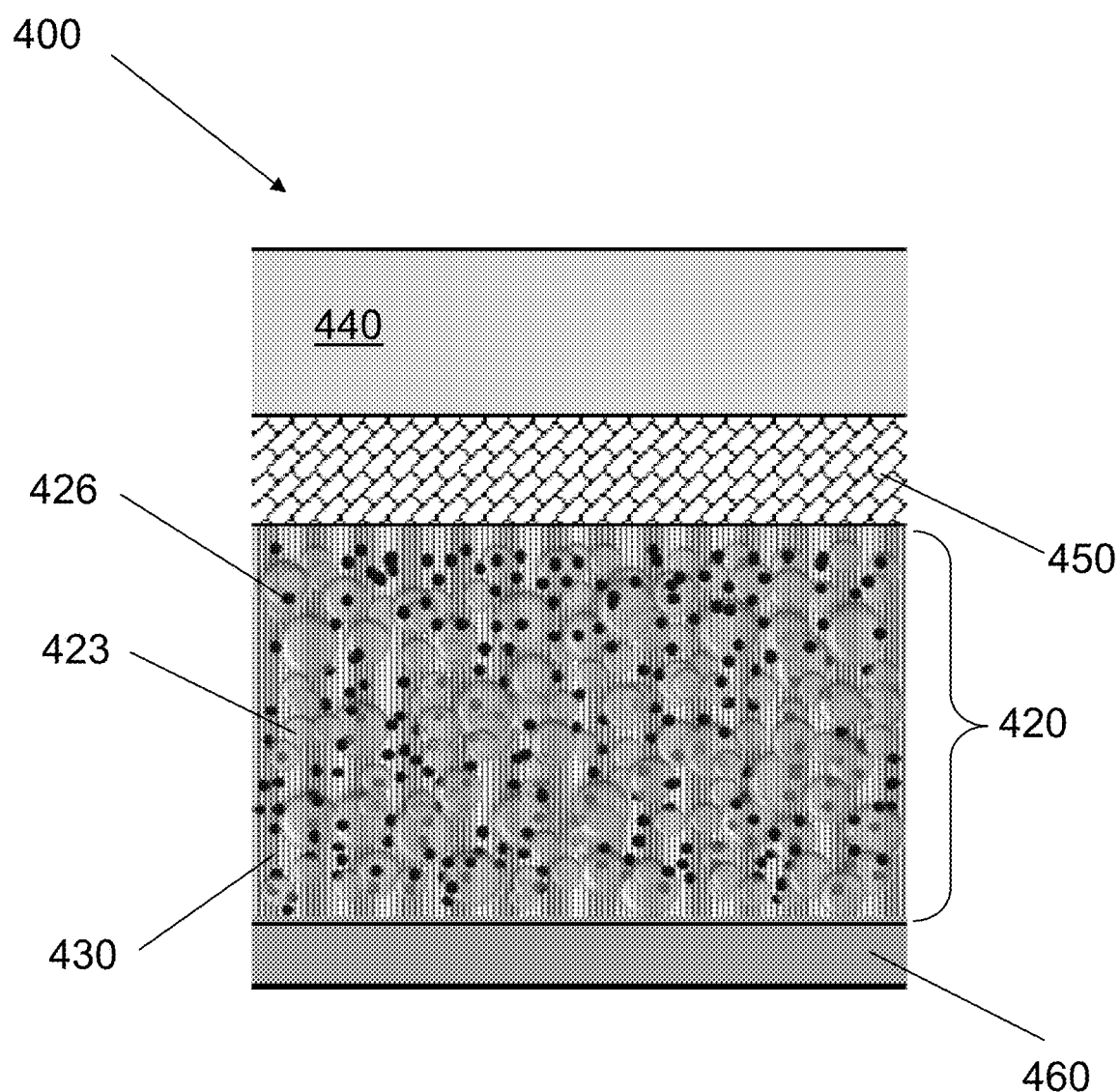
FIG. 4 is a schematic illustration of a lithium metal cell with a sulfur-based cathode that uses a sulfur-sequestering catholyte, according to an embodiment of the invention.

FIG. 4 is a schematic illustration of a lithium metal cell 400 with a sulfur-based cathode 420 that uses a sulfur-sequestering catholyte 430, according to an embodiment of the invention. The cell 400 also has a lithium metal anode 440 and a separator 450 between the anode 440 and the cathode 420. The sulfur-sequestering catholyte 430 is included in the bulk of the cathode 420 and can be seen as light grey stripes. The cathode 420 also has sulfur-containing active material particles 423 and electronically conductive particles 426. In one arrangement, the cathode active material particles 423 are made of SPAN. The cathode 420 may also contain additional electrolytes or binders (not shown). There may also be a current collector 460 adjacent to the cathode 420.

Figure 5:
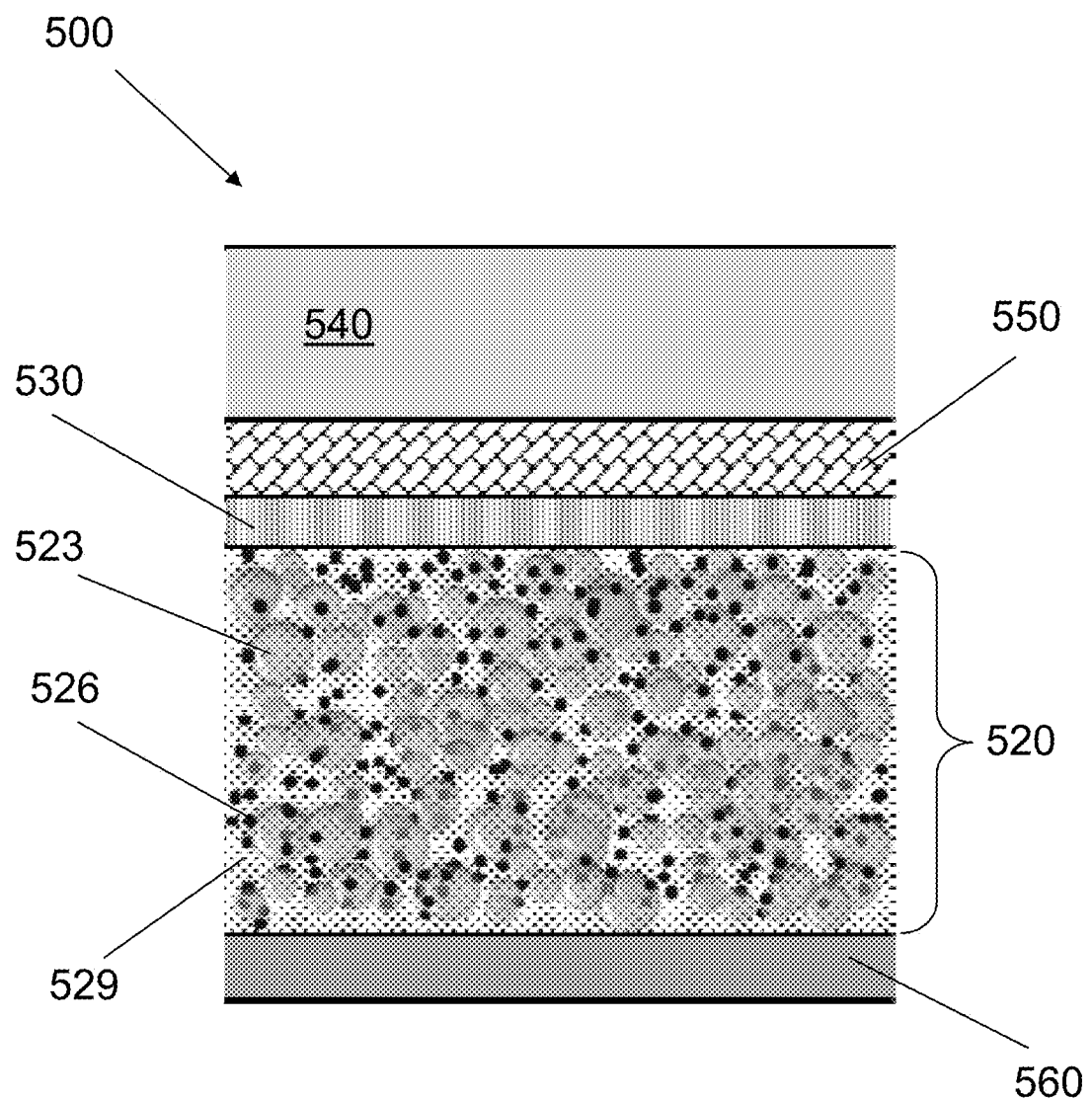
FIG. 5 is a schematic illustration of a lithium metal cell with a sulfur-based cathode that has a layer of sulfur-sequestering electrolyte between the cathode and the separator, according to an embodiment of the invention.

FIG. 5 is a schematic illustration of a lithium metal cell 500 with a sulfur-based cathode 520 that uses a sulfur-sequestering electrolyte, according to another embodiment of the invention. The cell 500 also has a lithium metal anode 540 and a separator 550 between the anode 540 and the cathode 520. There is a layer of sulfur-sequestering electrolyte 530 between the separator 550 and the cathode 520 and can be seen as light grey stripes. The cathode 520 has sulfur-containing active material particles 523 and electronically conductive particles 526. In one arrangement, the cathode active material particles 523 are made of SPAN. The cathode 520 also contains a second electrolyte 529 and may contain binders (not shown). There may also be a current collector 560 adjacent to the cathode 520.

Figure 6:
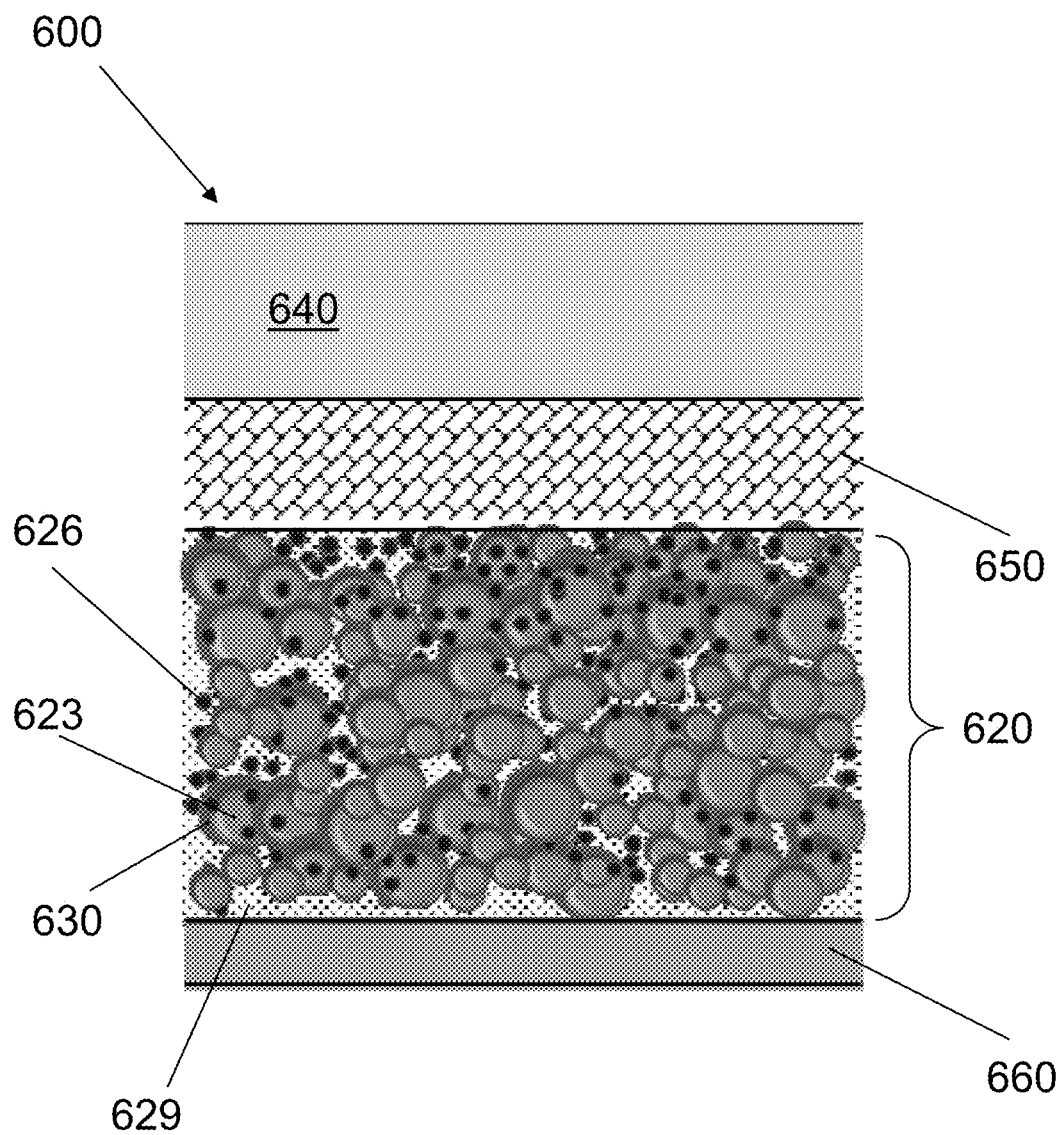
FIG. 6 is a schematic illustration of a lithium metal cell with a sulfur-based cathode in which individual cathode active material particles are coated with a sulfur-sequestering electrolyte, according to an embodiment of the invention.

FIG. 6 is a schematic illustration of a lithium metal cell 600 with a sulfur-based cathode 620 that uses a sulfur-sequestering catholyte, according to another embodiment of the invention. The cell 600 also has a lithium metal anode 640 and a separator 650 between the anode 640 and the cathode 620. The cathode 620 has sulfur-containing active material particles 623 and electronically conductive particles 626. In one arrangement, the cathode active material particles 623 are made of SPAN. The sulfur-containing active material particles 623 are coated with a layer of sulfur-sequestering catholyte 630, which can be seen as dark grey edges 630 around the particles 623. In some arrangements, a charge transfer tie-layer (not shown) may be used to improve charge transfer between the catholyte coating 630 and the cathode particles 623. The cathode 620 also contains a second electrolyte 629 and may contain binders (not shown). There may also be a current collector 660 adjacent to the cathode 620.

In another embodiment, two or more of the barrier configurations, as shown in FIGS. 4, 5, and 6 are used in the same cell. For example, a catholyte particle coating may be used to minimize the amount of elemental sulfur that is formed. In addition a catholyte binder may be used to act as a barrier to elemental sulfur diffusion. Finally, an overcoat layer may be used to prevent lithium polysulfide and elemental sulfur diffusion.

Figure 7:
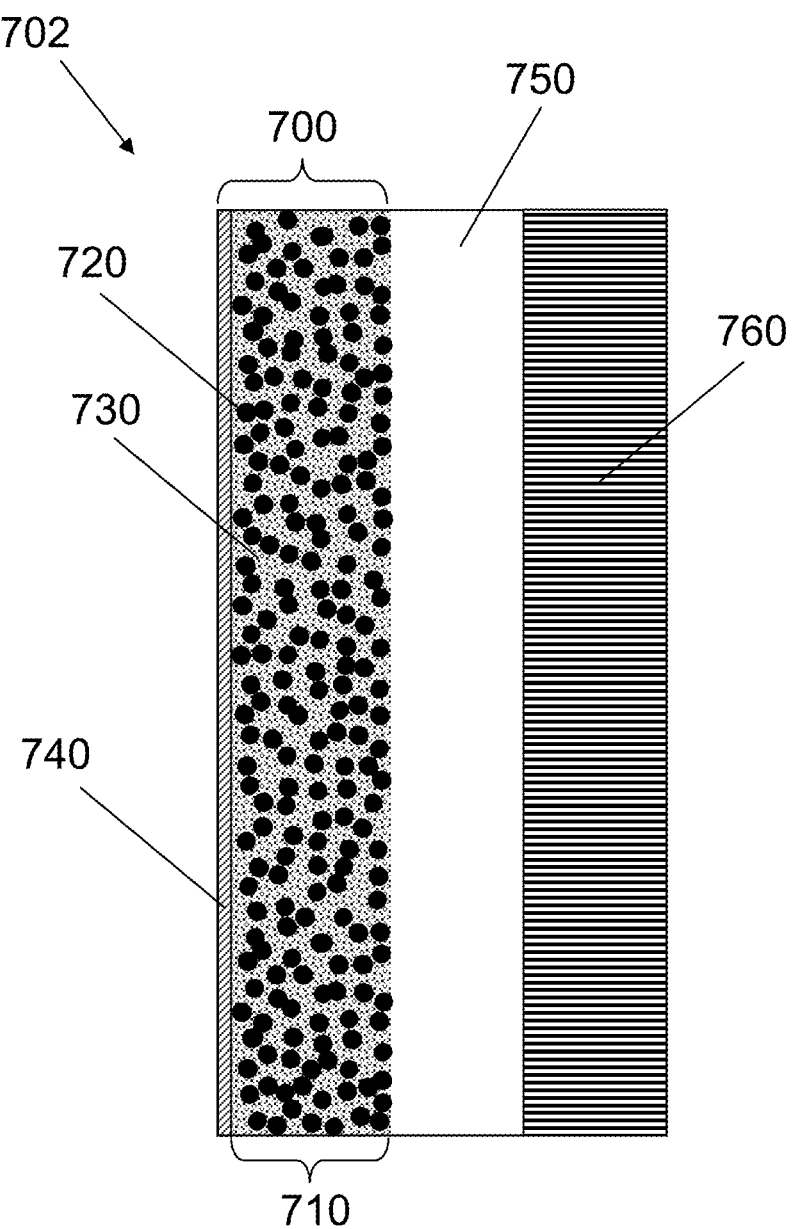
FIG. 7 is a cross-sectional schematic drawing of an electrochemical cell, according to an embodiment of the invention.

FIG. 7 is a cross-sectional schematic drawing of an electrochemical cell 702 with a positive electrode assembly 700, according to an embodiment of the invention. The positive electrode assembly 700 has a positive electrode (cathode) film 710 and an optional current collector 740. The positive electrode film 710 has positive electrode active material particles 720, such as elemental sulfur or a sulfur composite material, embedded in a matrix of electrolyte 730 that also contains small, electronically-conductive particles (as indicated by small grey dots) such as carbon black. The polymer electrolyte 730 can be a polymer or a block copolymer, as described above. Combinations of the polymer and block copolymer electrolyte are also possible. There is an optional positive electrode current collector 740 that may be a continuous or reticulated metal film. There is a negative electrode (anode) 760 that is a metal layer, such as a lithium layer, that acts as both negative electrode active material and negative electrode current collector.

There is a separator region 750 filled with an electrolyte that provides ionic communication between the positive electrode film 710 and the negative electrode 760. In one arrangement, the separator region 750 contains a solid electrolyte and can be the same electrolyte (without the carbon particles) 730 as is used in the positive electrode film 710.

Figure 8:
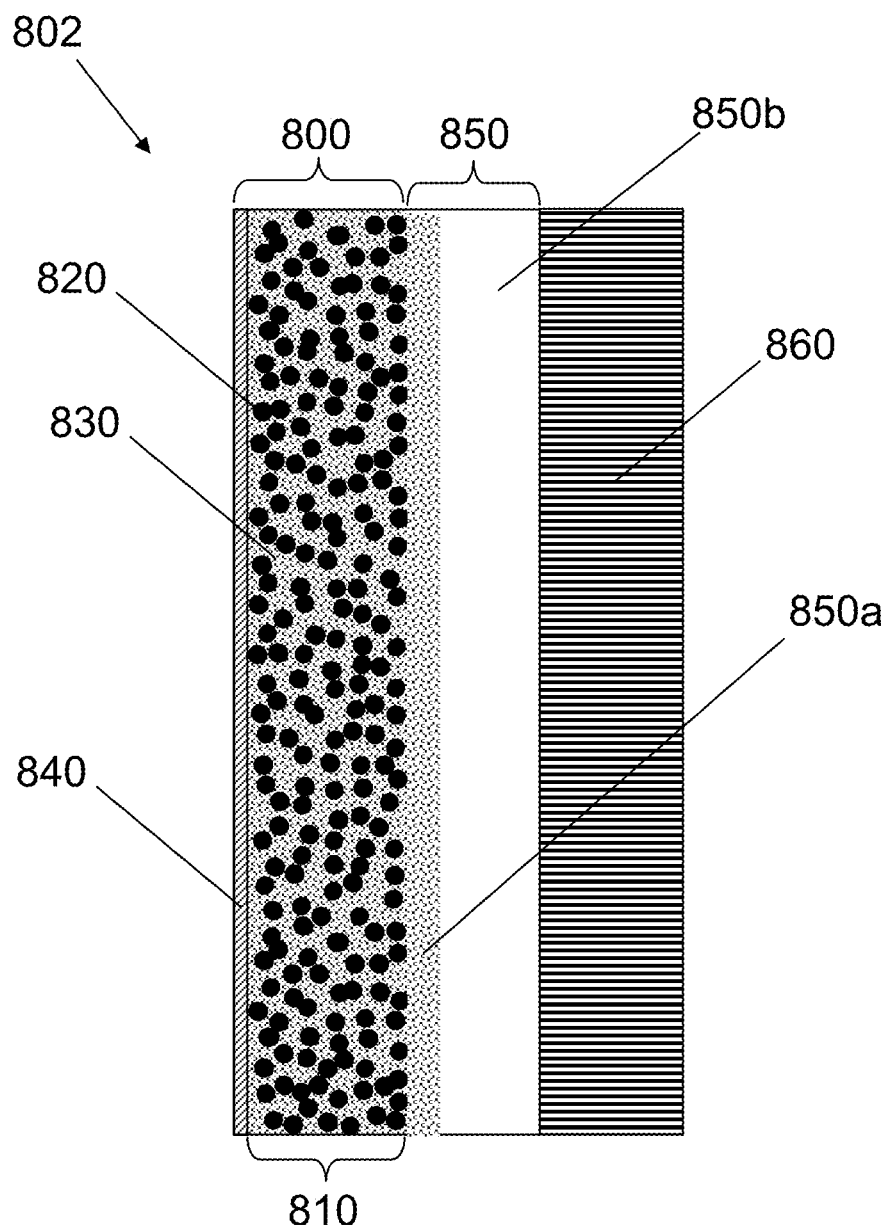
FIG. 8 is a cross-sectional schematic drawing of an electrochemical cell, according to another embodiment of the invention.

FIG. 8 is a cross-sectional schematic drawing of an electrochemical cell 802 with a positive electrode assembly 800, according to another embodiment of the invention. The positive electrode assembly 800 has a positive electrode film 810 and an optional current collector 840. The positive electrode film 810 has positive electrode active material particles 820, such as elemental sulfur or a sulfur composite material, embedded in a matrix of electrolyte 830 that also contains small, electronically-conductive particles (as indicated by small grey dots) such as carbon black. The polymer electrolyte 830 can be a polymer or a block copolymer, as described above. Combinations of the polymer and block copolymer electrolyte are also possible. There is an optional positive electrode current collector 840 that may be a continuous or reticulated metal film. There is a negative electrode 860 that is a metal layer, such as a lithium layer, that acts as both negative electrode active material and negative electrode current collector.

There is a separator region 850 that has two regions, 850a and 850b. Region 850a is a layer of a polymer or a block copolymer, as described above, and provides extra protection against diffusion of polysulfide species away from the cathode 810. When such a protective layer 850a is used, it is possible to use a different kind of electrolyte within the cathode 810 itself, as the protective layer 850a may be able to prevent all polysulfide species from leaving the cathode 810 by itself. Region 850b is filled with an electrolyte that provides ionic communication between the positive electrode film 810 (through the protective layer 850a) and the negative electrode 860. In one arrangement, the separator region 850 contains a solid electrolyte and can be the same electrolyte (without the carbon particles) 830 as is used in the positive electrode film 810 and or as used in the protective layer 850a.

This invention has been described herein in considerable detail to provide those skilled in the art with information relevant to apply the novel principles and to construct and use such specialized components as are required. However, it is to be understood that the invention can be carried out by different equipment, materials and devices, and that various modifications, both as to the equipment and operating procedures, can be accomplished without departing from the scope of the invention itself.

I claim:

1. A composition comprising:
   a lithium salt; and
   an ionically conductive polymer comprising;
   a first monomer comprising a phosphoester backbone; and
   a second monomer comprising an allyloxymethyl group capable of polysulfide addition.

2. A block copolymer electrolyte comprising:
   a first lamellar domain comprising a plurality of first polymer blocks comprising composition of claim 1, the first domain forming a conductive portion of the electrolyte material; and
   a second lamellar domain comprising a plurality of second polymer blocks, the second domain adjacent the first lamellar domain and forming a structural portion of the electrolyte material.

3. The block copolymer electrolyte of claim 2 wherein the first lamellar domain and the second lamellar domain comprise a plurality of linear diblock copolymers.

4. The block copolymer electrolyte of claim 3 wherein the linear diblock copolymer has a molecular weight of at least 150,000 Daltons.

5. The block copolymer electrolyte of claim 3 wherein the linear diblock copolymer has a molecular weight of at least 350,000 Daltons.

6. The block copolymer electrolyte material of claim 2 wherein the first lamellar domain and the second lamellar domain comprise a plurality of linear triblock copolymers.

7. The block copolymer electrolyte of claim 2 wherein the second polymer blocks comprise a non-ionic-conducting polymer with a bulk modulus greater than $10^7$ Pa at 90 degrees C.

8. The block copolymer electrolyte of claim 2 wherein the second polymer blocks comprise a component selected from a group comprising styrene, methacrylate, vinylpyridine, vinylcyclohexane, imide, amide, propylene, alphamethylstyrene and combinations thereof.

* * * * *